United States Patent [19]
Wooten et al.

[11] Patent Number: 5,590,292
[45] Date of Patent: Dec. 31, 1996

[54] SCALABLE TREE STRUCTURED HIGH SPEED INPUT/OUTPUT SUBSYSTEM ARCHITECTURE

[75] Inventors: David R. Wooten, Spring; Craig A. Miller, Cedar Park; Kevin B. Leigh, Houston; Robert B. Costley, Spring; Christopher E. Simonich, Tomball, all of Tex.

[73] Assignee: Compaq Computer Corporation, Houston, Tex.

[21] Appl. No.: 7,333

[22] Filed: Jan. 21, 1993

Related U.S. Application Data

[63] Continuation-in-part of Ser. No. 986,918, Dec. 8, 1992.
[51] Int. Cl.⁶ .............................. G06F 13/36; G06F 15/17
[52] U.S. Cl. ............................................ 395/825; 370/419
[58] Field of Search ................................... 395/275, 375, 395/250; 370/54, 56; 364/200

[56] References Cited

U.S. PATENT DOCUMENTS

| | | | |
|---|---|---|---|
| 3,510,843 | 5/1970 | Bennett et al. | 395/275 |
| 4,100,601 | 7/1978 | Kaufman et al. | 395/852 |
| 4,237,447 | 12/1980 | Clark | 340/825.02 |
| 4,726,017 | 2/1988 | Krum et al. | 370/85.8 |
| 4,864,303 | 9/1989 | Ofek | 341/95 |
| 4,937,817 | 6/1990 | Lin | 370/94.1 |
| 4,955,015 | 9/1990 | Lobjinski et al. | 370/56 |
| 5,099,473 | 3/1992 | Gupta et al. | 370/56 |
| 5,222,062 | 6/1993 | Sharma et al. | 370/56 |
| 5,331,637 | 7/1994 | Francis et al. | 370/54 |

FOREIGN PATENT DOCUMENTS

WO91/14229 12/1991 WIPO .

OTHER PUBLICATIONS

Alan Clements, Microprocessor Systems Design, 1987, pp. 36–45.
Packet Structure for Self–Routing Switching Fabric, IBM Technical Disclosure Bulletin, vol. 31, No. 2, Aug. 1988, pp. 465–466.

Primary Examiner—Parshotam S. Lall
Assistant Examiner—Kenneth R. Coulter
Attorney, Agent, or Firm—Pravel, Hewitt, Kimball & Krieger

[57] ABSTRACT

A point to point connection architecture for a computer I/O subsystem, resulting in a scalable tree structure. A Master I/O Concentrator (MIOC) is connected to the host bus and handles conversion between a bus oriented structure and the tree structure of the I/O subsystem. Ports away from the host bus are downstream ports and conform to a simple byte wide message protocol. Various IOCs and devices can be attached to one of the downstream ports on the MIOC. The MIOC directs transmissions to the appropriate channel based on a geographical addressing scheme. The IOC connections act as further points of branching. Ultimately IOD or I/O devices are reached, having an upstream port for connection to the IOC and a downstream port and internal logic appropriate for the particular peripheral device. Various registers are present in the IOCs and the IODs to allow determination of the topology and particular devices present. Messages and commands are transferred in the I/O subsystem in defined packets. Various read, write and exchange commands are used, with a read response being utilized to allow split transaction read operations. Certain status and control commands are also present. Interrupts are handled by having the interrupt levels correspond to memory addresses of the programmable interrupt controller, thus allowing simple selection of interrupts to be generated by the devices and no need for separate wiring.

27 Claims, 16 Drawing Sheets

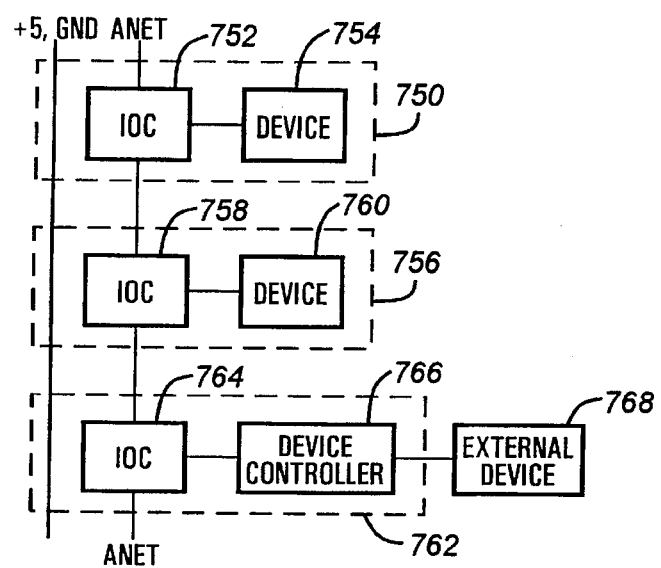
FIG. 16A
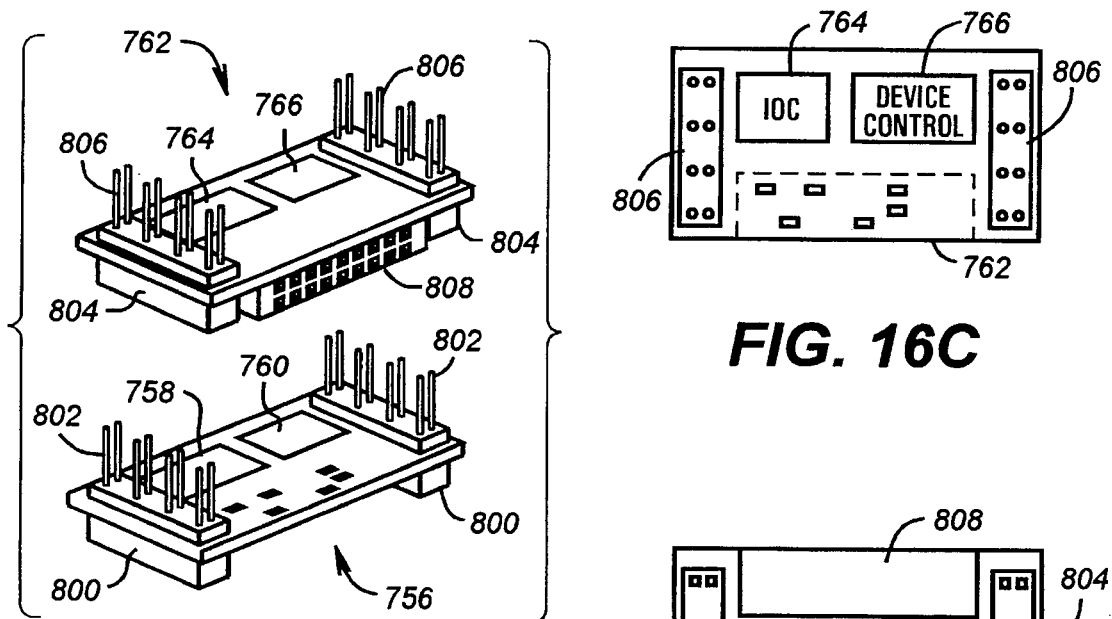
FIG. 16C
FIG. 16B
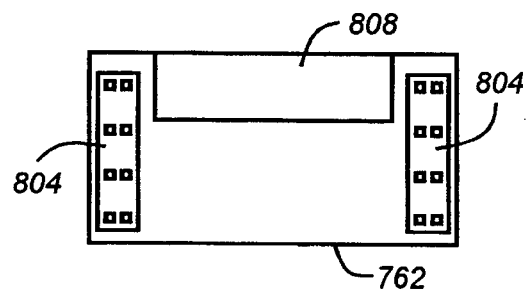
FIG. 16D

SCALABLE TREE STRUCTURED HIGH SPEED INPUT/OUTPUT SUBSYSTEM ARCHITECTURE

This is a continuation-in-part of Ser. No. 07/968,918, filed Dec. 8, 1992.

BACKGROUND OF THE INVENTION

1. Field of the Invention

The invention relates to computer system architectures, and more specifically to an architecture having input/output devices arrayed in a tree configuration from a main bus, with data transfer being done with command and data packets.

2. Description of the Related Art

Personal computers have been developing very rapidly. Initial designs had relatively low performance microprocessors, with relatively low performance input/output (I/O) and peripheral devices. Therefore a simple conventional bus architecture was quite adequate. However, performance of some of the components began increasing at a very high rate. Soon the simple bus architectures, particularly those with separate I/O spaces became a limiting factor. The bus speeds were simply too slow for adequate peripheral and I/O throughput. Several variations were tried to improve the capabilities of the bus, mainly increasing the data path widths and transfer cycle speeds, but the bus architecture was still a limiting factor. Because interchangeable circuit boards were desired, widths were limited, as were speeds. Additionally, device loadings and capacitances became a problem, so that fewer slots were available at the highest of speeds. And yet the microprocessors continued to increase in performance, as did peripheral performance as increased use was made of local processors to allow parallel operation. But still the bus speed limitations remained. Variations were suggested that required removal of the card slots, but this solution provided only a short term solution, with the next generation of microprocessors again due to out strip this more integrated solution. Thus, while computer system performance was increasing, the effective rate of increase was significantly less than the basic processor performance improvement, system flexibility was being reduced and costs and complexities were being increased.

Further, the use of buses limited the number of available slots and layout of any slots. The number of slots available internally on a bus was practically limited to about eight due to electrical loading limitations. External expansion slots were not usually viable for high speed operations because of timing problems induced in the connection cabling. And the buses limited the layout alternatives of the slots. To be at all efficient of circuit board space the bus conductors had to run parallel, with the slots thus also being parallel, forming a rectangular box which had to be reserved for expansion cards. When a design was started, this rectangular box had to be included as a requirement, greatly reducing the flexibility of the design. Additionally, concerns of signal skew due to varying length conductors and reflections due to multiple taps also necessitated the conventional physically parallel structure.

Notebook and handheld computers have become quite powerful. However, because of their small size, expansion of capabilities is very difficult. Historically, custom modules were required for each unit because of form factor concerns. Recently, PCMCIA cards have become available. Their small size, approximately that of a thick credit card, has allowed their use in notebook computers. But again, expansion is still limited. Usually the maximum number of cards which can be incorporated is two, because of the size limitations incurred because of the bus connection used with PCMCIA. So even then notebook and handheld computer expansion is limited.

Therefore a new system architecture was needed which allowed for compatibility with existing software but allowed for a more performance improvement than a conventional bus architecture for the I/O devices while reducing costs, and provided greater expandability and used space more efficiently.

SUMMARY OF THE INVENTION

A system according to the present invention allows a computer to utilize existing applications software, but allows for a great improvement in I/O capabilities at a lower cost than present solutions, with greater expansion capabilities and lower space requirements. The basis for the system is a point-to-point connection for the I/O subsystem, resulting in a tree structure, allowing parallel I/O operations separate from processor operations and separation of I/O devices with varying bandwidths. By reducing the loadings on the transmission lines to a single load, very high data rates can be achieved with MOS logic.

A Master I/O Concentrator (MIOC) is connected to the conventional, high performance host bus and handles conversion between a bus oriented structure and the tree structure of the I/O subsystem. Ports away from the host bus are downstream ports and conform to a simple byte wide transmission protocol to further allow high speed transfer. Various IOCs and devices can be attached to one of the downstream ports on the MIOC. The MIOC directs transmissions to the appropriate channel based on a geographic addressing space. The IOC connections act as further points of branching. Ultimately IOD or I/O devices are reached, having an upstream port according to the protocol of the present invention and a downstream port and internal logic appropriate for the particular peripheral device of interest.

Various registers are present in the IOCs and the IODs to allow determine of the topology and particular devices present. Messages and commands are transferred in the I/O subsystem in defined packets. Various read, write and exchange commands are used, with a read response being utilized to allow split transaction read operations. Certain status and control commands are also present. Interrupts are handled by having the interrupt levels correspond to memory addresses of the programmable interrupt controller, thus allowing simple selection of interrupts to be generated by the devices and no need for separate wiring.

In certain multiprocessor variations, the processor cards each include an MIOC and communicate directly with each peripheral group and shared memory, thus not having a common, shared bus which would reduce performance. In a small system variation, the MIOC is located directly on the microprocessor chip, with ports for the graphics/video system and to an IOC through which the remaining peripherals are accessed. The memory system is connected to the microprocessor and addressable by the internal MIOC. Thus the actual connection of the I/O subsystem to the processor and memory may vary from design to design and numerous other examples and connections can be developed.

The reduced number of interface pins allows the physical size of an A-Net-based device to be very small, as the connector requirements are minimal. This lends itself well to slotted or connected arrangements. These small size and slot capability allows greater expansion capabilities for notebook computers and easier connection to an expansion base. Further, the small size lends itself to a simple, daisychain stacking arrangement, increasing device interconnect flexibility. Alternatively, the small size removes the circuit board layout problems as only a very few wires are needed, allowing slots to be placed where they best fit, not all massed together.

Thus a high performance, expandable, yet low cost, I/O subsystem architecture is provided according to the present invention.

BRIEF DESCRIPTION OF THE DRAWINGS

A better understanding of the present invention can be obtained when the following detailed description of the preferred embodiment is considered in conjunction with the following drawings, in which:

FIGS. 7A, 7B–12 are timing diagrams of operations between two input/output communication ports according to the present invention;

FIG. 16A is a block diagram of a daisy-chain connection scheme;

FIG. 16B is an exploded, perspective view of circuit boards of the daisy chain of FIG. 16A;

FIG. 16C is a top view of a circuit board of FIG. 16B; and

FIG. 16D is a bottom view of a circuit board of FIG. 16B.

DETAILED DESCRIPTION OF THE PREFERRED EMBODIMENT

Prior to addressing the figures, it is considered helpful to define certain terms. A node is a device having at least one electrical means of sending or receiving information. A channel is the connection between nodes. A port is the electrical interface in a node that comprehends a channel protocol. A point-to-point channel is a channel to which only two nodes are connected. A field is a collection of bits and/or bytes that, taken together, convey a single piece of information. A packet is any grouping of one or more fields. A message is a packet containing a command field, or a command field followed by an address field, or a command field followed by a data field, or a command field followed by an address field followed by a data field. A packet will generally mean a packet with the attributes of a message. Transmission is sending a message on a channel. Upstream is referenced as being towards system memory, while downstream is considered to be away from system memory. An IOC is an input/output concentrator, which is a device having at least one upstream port (usually only one) and at least one downstream port (usually more than one). The function of an IOC is to control the movement of messages between the upstream port(s) and the downstream port(s). The protocols on an IOC's upstream port(s) and downstream port(s) may differ. An MIOC is an IOC that has an upstream port interfacing to system memory. An IOD is an input/output device having a downstream port connected to a peripheral device. A device can combine properties of an IOC and an IOD to include a downstream port to a peripheral device and a downstream ANP. A collision is an attempt by both ports to arbitrate for an idle channel at the same time. A-Net is the phrase used to generally refer to components conforming to the present invention.

Figure 1:
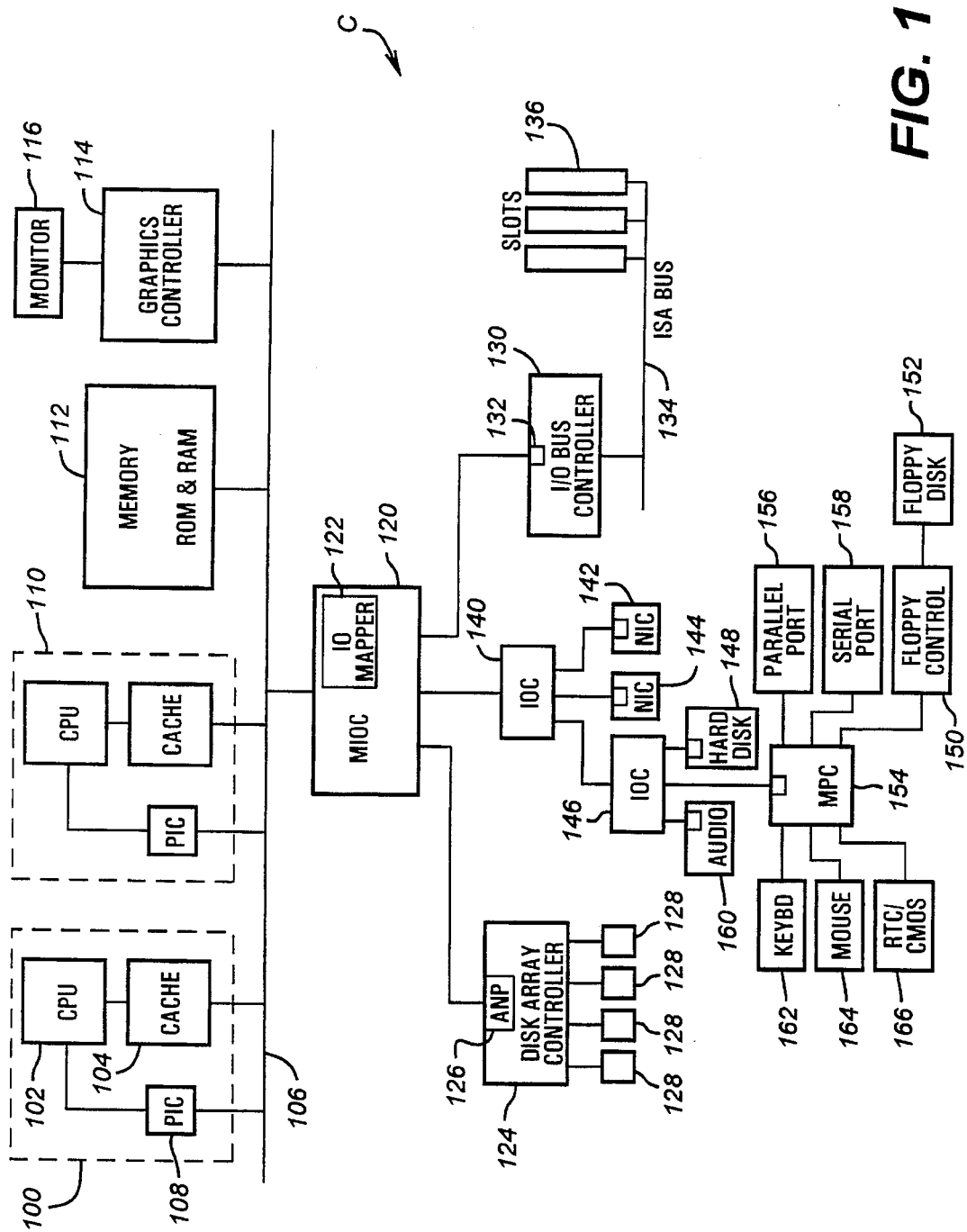
FIG. 1 is a block diagram of a computer system utilizing the architecture of the present invention.

Referring now to FIG. 1, a computer system C incorporating the architecture of the present invention is shown. The illustrated embodiment is a multiprocessor configuration. It is understood that the architecture would also apply in single processor cases. A first processor 100 includes a CPU or microprocessor 102 which is connected to a cache system 104, with the cache system 104 in turn being connected to a main or host bus 106. A programmable interrupt controller (PIC) 108 is connected between the host bus 106 and the microprocessor 102, with this connection to be described below. A second processor 110 includes similar components and is connected in a similar fashion as the processor 100. The main memory 112 which includes read only memory (ROM) and random access memory (RAM) is connected to the host bus 106. Preferably the memory 112 includes sufficient memory controllers and memory decode logic to allow access. Additionally, a graphics controller 114 is connected to the host bus 106. The host bus 106 is preferably a very high speed bus according to the prior art and would, for example, have a data bus portion which is 64 bits wide having very short cycle times. This will allow a fast movement of data along the bus 106. The graphics controller 114 has a monitor 116 connected to provide a video output.

In a conventional system, a bus controller would then be used to link from the host bus 106 to an input/output bus, such as the EISA or MCA buses. However as noted in the background of the invention, such buses are highly bandwidth limited and so in the computer system C the input/output and peripheral devices are connected in an entirely different manner, in a point to point connection scheme resulting in a tree structure. An MIOC 120 is connected to the host bus 106. The MIOC 120 preferably includes an I/O mapper 122, which performs the function of mapping or translating I/O space addresses as provided by Intel Corporation processors to a memory mapped environment, as the architecture of the computer system C preferably is a flat, memory mapped architecture with no split as conventional in Intel processors. By use of the I/O mapper 122, conventional personal computer software can be executed on the computer C without a need to recompile or reassemble the applications programs to reference the peripheral devices at memory locations instead of the prior and conventional I/O locations. Details of the MIOC 120 will be described below. The MIOC 120 has three downstream ports which are configured as A-Net ports (ANPs) according to the present invention. Many details of the A-Net ports will be described below. The MIOC 120 can contain a number of ports but in the present example three are shown. One downstream port is connected to a disk array controller 124 which includes an upstream ANP 126 for connection to the MIOC 120. The disk array controller 124 then performs the various functions needed to control a plurality of hard disk drives 128 in fashions as known in the prior art and to those skilled in the art. This arrangement is preferred in the computer system C because the disk array controller 124 is a high performance unit which has a very large data throughput capability and so a direct connection to the MIOC 120 is preferred.

Additionally, an I/O bus controller 130 has an ANP 132 connected to the downstream ports of the MIOC 120. The bus controller 120 on its downstream port preferably provides an ISA bus 134 which has a plurality of slots 136. Preferably the bus 134 is ISA and not one of the more powerful EISA or MCA buses as it is used only for certain compatibility reasons, with the majority of the high performance peripheral devices which would utilize the capabilities of the more advanced buses being connected according to the architecture of the present invention. Indeed in many cases it may be desirable not to even have an I/O bus controller 130, but merely to include additional slots connected to various ports of various IOCs.

Alternatively, the graphics controller 114, and/or a live motion video system, could be connected to the MIOC 120 instead of being connected to the host bus 106.

An IOC 140 has its upstream port connected to the final downstream port of the MIOC 120. The IOC 140 in the shown example has three downstream ports, two of which are connected to network interface cards 142 and 144. Preferably the NIC cards 142 and 144 also contain ANP ports to allow direct connection to the IOC 140. The final downstream port of the IOC 140 is provided to the upstream port of yet another IOC 146. The IOC 146 preferably has three downstream ports, with one being connected to a hard disk unit which has a compatible upstream ANP. A second is connected to an audio interface 160. The third port of the IOC 146 is connected to an ANP port of a multiple peripheral chip (MPC) 152. Preferably the MPC 152 is a combination chip as well known in the personal computer system design and includes interfaces to a parallel port 156, a serial port 158, a keyboard 162, a mouse or pointing device 164, real time clock/CMOS memory 166 and a floppy disk controller 150 which has connected to it a conventional floppy disk drive 152.

As can be seen from the architecture of the computer system C, the lowest performance peripherals are connected to the MPC 154, which is three levels of concentrator, that is the MIOC 120, IOC 140 and the IOC 146, away from the host bus 106. This fan out or tree structure is acceptable as the reduced data requirements of the devices reduces as the tree is traversed to a lower level. For example, the hard disk 148 and the audio system 160 connected to the IOC 146 are higher performance devices and so are connected at a higher level of bandwidth and capacity. Similarly, the network interface cards 142 and 144 are considered to be very high bandwidth devices and thus preferably are connected further up the tree.

Figure 1A:
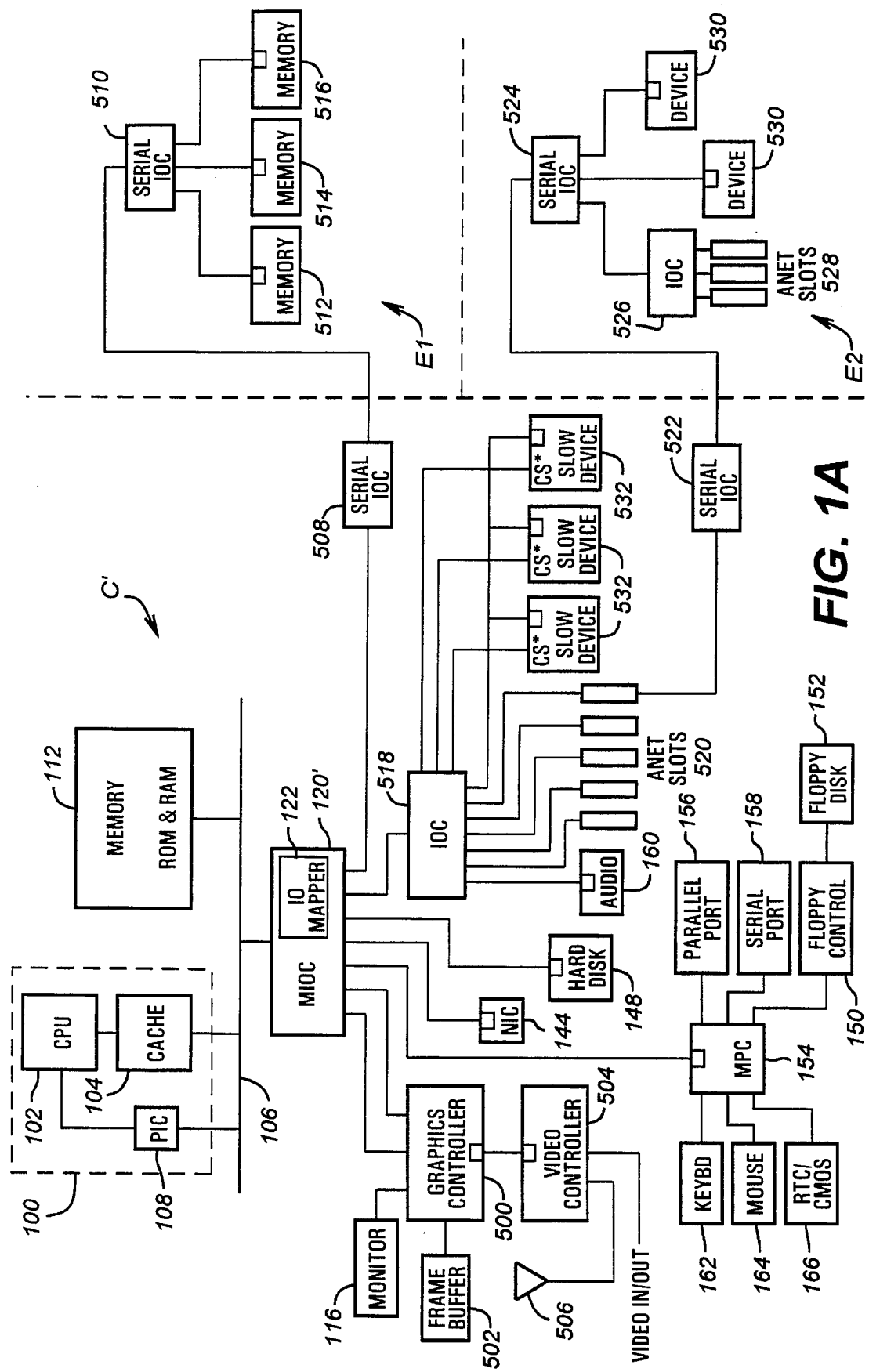
FIG. 1A is a block diagram of an alternate embodiment of a computer system utilizing the architecture of the present invention, with external expansion capabilities indicated.

Referring now to FIG. 1A, an alternate embodiment of a computer C' is shown. Where elements are similar to those of the computer C shown in FIG. 1, like numbers are repeated. The first difference of the computer C' is that the MIOC 120' has seven ports to downstream devices to allow seven A-Net devices to be connected to it. The first device of interest is the graphics controller 500, which is now connected to the MIOC 120'. It is further noted that two A-Net channels are utilized in this connection. This allows a higher bandwidth between the two devices, which is particularly appropriate for a graphics controller 500 which can utilize this higher bandwidth. The graphics controller 500 has connected to it a frame buffer 502 which it controls and which is used to store the actual pixel information which is provided to the monitor 116. A video controller 504 is also connected to the graphics controller 500. The video controller has video input and output ports and can receive an antenna 506. The video controller 504 is used with live motion video from such sources as video recorders, video cameras, and broadcast television. This information is directly provided to the graphics controller 500, preferably via an A-Net channel. This allows a simple interface to be developed in both units. Further, by connecting the video controller 504 to the graphics controller 500 through an A-Net port, thus having the graphics controller to some extent operate as an IOC, then the bandwidth required by the video controller 504 to graphics controller 500 link is effectively isolated from the host bus 106 and from the MIOC 120'. This allows a greater system performance than if the units were directly connected to the host bus 106.

A second difference is the connection of a serial IOC 508 to the MIOC 120'. The serial IOC 508 in this case has a downstream serial channel which conforms to the A-Net command and packet protocol except that all data transfers are done in a serial manner. This allows for easy expansion to a location remote from the computer C'. For example, an expansion unit E1 can contain a second and matching serial IOC 510. The serial IOCs 508 and 510 are a matching pair, one having an upstream serial port and one having a downstream serial port. The serial IOC 510 can have connected to it for example, memory 512, 514 and 516 so that the expansion box E1 can be a memory expansion box, for example. Given the bandwidth of the A-Net channel at a preferred data rate of 50 Mbytes per second, assuming that this memory is somewhat infrequently accessed and has a relatively high locality so that necessary data is commonly cached, memory expansion in this manner is quite easy. The memory 512, 514 and 516 could for example be nonvolatile memory such as EEPROM used for long term storage.

An IOC 518 is connected to the MIOC 120'. This IOC 518 also has illustrated seven ports for connection to downstream devices. Five of the ports are connected to A-Net slots 520. The A-Net slots 520 are used to receive interchangeable cards which include an A-Net port in an interface as will be described below. Because only a small number of pins are utilized in an A-Net channel, the A-Net slots 520 can be quite small, such as for example 28 pins, the 16 extra pins being used for power and ground connections. This allows a small connector size, which allows the system designer great latitude in the physical slot locations. Thus parallel connections as in typical slots are not required and system flexibility is increased. One of the slots 520 could contain a board including a serial IOC 522. The serial IOC 522 could be connected to a mating serial IOC 524 in a second expansion box E2. The serial IOC 524 could be connected to a downstream IOC 526 and several devices 530. The IOC 526 may also have connected to it a further series of A-Net slots 528. Thus the number of A-Net slots can be easily and simply increased by use of an additional expansion box. It is considered desirable that the computer C' contains a minimum number of A-Net slots 520 necessary to meet the requirements of the greatest number of users, while an expansion unit E2 can be utilized with a relatively small performance degradation to meet the needs of a larger number of users which need more slotted expansion capabilities.

In certain very low bandwidth cases, a single downstream port on an IOC 518 can be shared by several I/O devices 532. In that special case device selects such as DS0*, DS1* and DS2* also are provided from the IOC 518.

Figure 14:
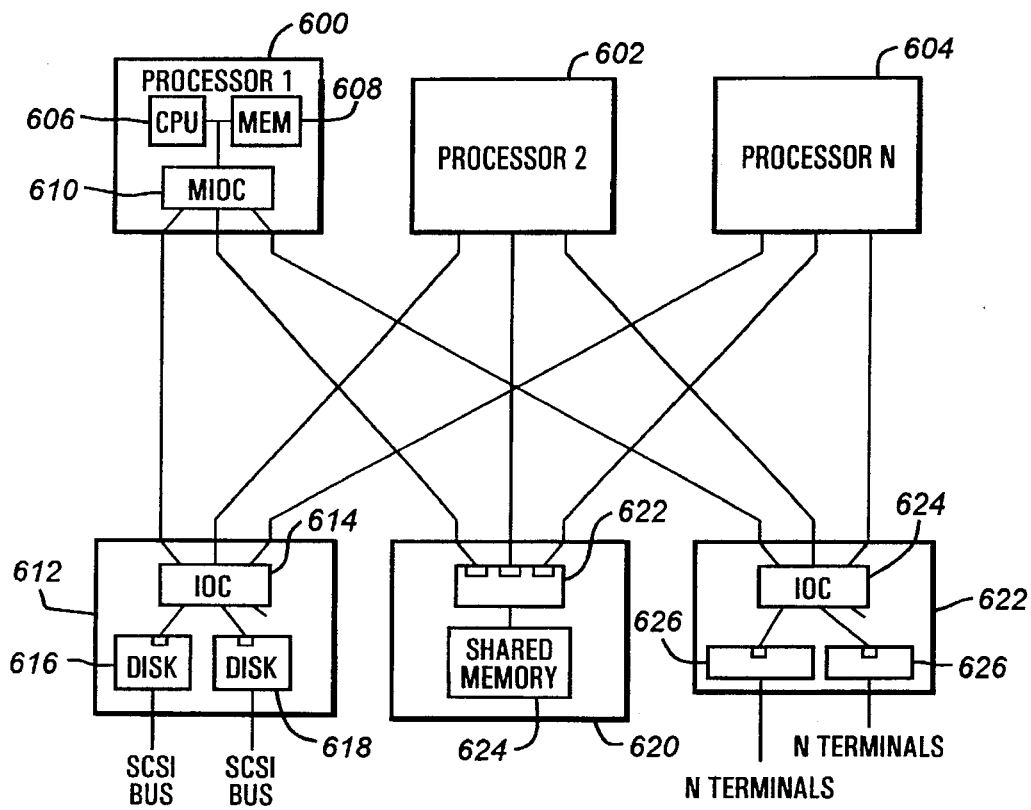
FIG. 14 is a block diagram of a multiprocessor system without a shared bus.

Referring now to FIG. 14, an alternate multiprocessor configuration is shown. Processors 600, 602 and 604 are shown, with each processor having essentially identical configurations. An exemplary processor design is shown for the processor 600. The processors include a CPU 606 which is connected to a local memory 608 and to a local MIOC 610. The MIOC 610 has a number of upstream ports which are connected to the various peripheral blocks to be explained. This is preferably a relatively loosely coupled multiprocessor system. In the illustrated embodiment, three basic peripheral blocks are shown. The first is the disk peripheral system 612. An IOC 614 has three downstream ports in the illustrated embodiment to be connected to an A-Net port from each of the processors 600, 602 and 604. Obviously, if more than three processors were used, more than three processor-connected ports would be present in the IOC 614. In the embodiment shown, the IOC 614 has ports connected to disk controllers 616 and 618, which may have SCSI buses or other standard configurations developed from them. This arrangement allows each processor 600, 602 and 604 to independently address the disk subsystem 612. No bus sharing is required or bus arbitration is required as no shared bus is necessary for the processors to access the disk sybsystem 612. The IOC 614 does all necessary port arbitration, allowing an effective high throughput to the disk subsystem 612 for each of the individual processors.

Preferably some shared memory also exists in the system. This is shown as block 620 which has an upstream A-Net IOC 622 which has three downstream ports. The IOC 622 is connected to the shared memory 624 and thus includes the inverse of a MIOC in that it converts from A-Net to an upstream port having a memory interface. Giving the high data rates of the A-Net channel, particularly if multiple frequency clocks are utilized, the shared memory accesses need not result in effective slowing down of the system, particularly if the local processor memory 608 is sufficiently large.

The final basic subsystem illustrated is a terminal concentrator 622. An IOC 624 has ports connected to each of the processors 600, 602 and 604 and has ports connected to terminal concentrators 626, with each of the terminal concentrators 626 having the desired number of terminals connected thereto. Obviously other portions of the peripheral system could be connected in a like manner or the various IOCs present in the subsystems could have additional channels so that additional subsystems could be developed. Thus it is seen in this system no bus is shared by the processors in the multiprocessor system, thus increasing system performance as arbitration for that shared bus is not necessary. Arbitration would only occur at a local device level and as this is believed to be greatly reduced as diversity of the operations increase overall system performance will also be increased.

Figure 15:
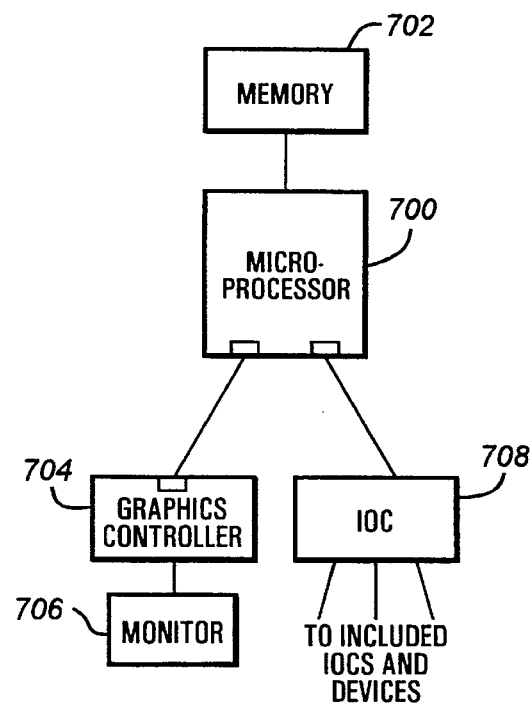
FIG. 15 is a block diagram of a very simple system.

In contrast to the complex system of FIG. 14, a very simple computer system is shown in FIG. 15. FIG. 15 would be exemplary of a simple notebook or laptop computer. A microprocessor 700 is at the core of the system. The microprocessor 700 includes all necessary elements to be a processor, such as a CPU and other elements. The microprocessor 700 also includes a memory interface to connect to system memory 702. Further, the microprocessor 700 contains an A-Net port to connect to a graphics controller 704, with a monitor 706 connected to the graphics controller 704. A second A-Net port is provided on the microprocessor 700 to connect to an IOC 708. The necessary remaining devices in the computer system, such as any additional IOCs needed for fan out and the particular devices, are connected below the IOC 708. The microprocessor 700 contains any necessary logic to allow the graphics controller 704 or the IOC 708 to access the memory 702. This could be done by a conventional busing arrangement with arbitration. It could also be done by various other known means, such as crosspoint switching and so It is noted that the computer systems C and C' are exemplary and many other alternatives and various designs could be developed as will be apparent from the more detailed description of the various components of the architecture described below.

Figure 2:
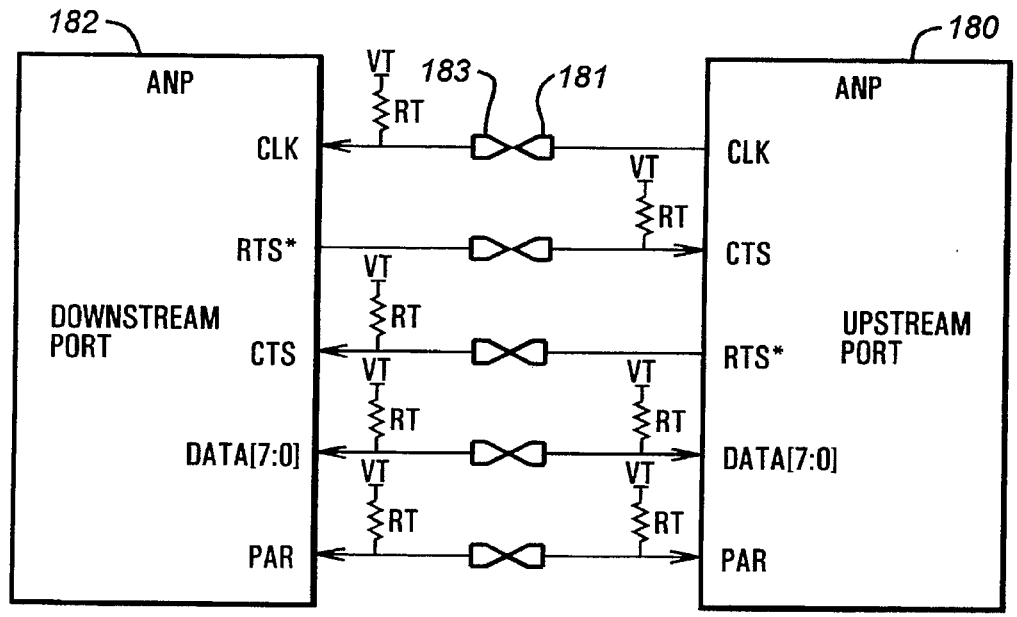
FIG. 2 is a schematic diagram of a connection between input/output communication ports in the computer system of FIG. 1.

Referring now to FIG. 2, the connection between two A-net ports is shown. The first A-net port 180 is considered to be the upstream port, while the second port 182 is considered to be a downstream port. There are twelve signals for each A-Net port. All signals are positive logic signals except those followed by an asterisk (*) which denotes negative logic.

| Signal | Direction | Descriptions |
| --- | --- | --- |
| D<7:0> | Input/Output | Eight pins used to transfer message fields (i.e. command, status, address and data.) |
| PAR | Input/Output | Odd data parity bit of D<7:0>. |
| RTS* | Output | Request-to-Send. |
| CTS | Input | Clear-to-send. |
| CLK | Output | Clock output from the upstream port that is used to synchronize transfers on the channel. |
| | Input | Clock input to the downstream port. |

Preferably each A-Net port is developed in a MOS technology and uses reduced-voltage-swing, open-drain drivers such as Gunning transistor logic for signaling between devices.

As noted above, A-Net slots can be developed. FIG. 2 shows the preferred location of the connectors 181 and 183 with respect to the pullup resistors $R_T$. An A-Net slot would also include provisions for power and ground. As can be seen, with power and ground only 28 pins are needed for an A-Net slot. This provides numerous advantages. The easier location of the slots in a system has been mentioned. Because of the reduced pin count on an A-Net board, the physical size of the board can be greatly reduced, to a size much smaller than even a PCMCIA card. The preferred size is in the range of a few square inches. This allows room for an A-Net slot connector, any necessary circuitry and a connector to an external device if necessary.

This small size lends itself quite nicely to use in a notepad or handheld computer. Four A-Net boards could easily be inserted in the space of two PCMCIA cards, thus effectively doubling the expansion capabilities of the notebook or handheld computer. The computers could be much more readily tailored to individual requirements. One of the A-Net slots could be used for connection to an expansion base. The expansion base peripheral devices would readily merge into the A-Net system topology and the interface would require far fewer pins (and thus a much less expensive connector) than used in current expansion bases where effectively an ISA connector and additional pins are necessary.

FIGS. 16A, 16B, 16C and 16D illustrate one possible arrangement which can be developed because of the very limited number of pins necessary for an A-Net channel. FIG. 16A illustrates a block diagram of a daisy chain arrangement. A first module 750 includes an IOC 752 having one downstream and one upstream port and one connection to a peripheral device 754. A second module 756 has an IOC 758 whose channel downstream port is connected to the channel upstream port of the IOC 752 and which has a channel upstream port and a connection to a peripheral device 760. A third module 762 has an IOC 764 whose channel downstream port is connected to the channel upstream port of the IOC 758 and which has a channel upstream port for further chaining and a connection to a device controller 766. The device controller 766 is connected to an external peripheral device 768. It is noted that power and ground connections are preferably passed through each module, with each module tapped into the signals.

Illustrative modules 756 and 758 are shown in FIG. 16B. The module 756 includes female connectors 800 preferably located on the bottom side of the module 756 and at each end. Male connectors 802 are present on the top side of the module 756 to mate with female connectors 804 on the module 762. The female connectors 800 are the channel downstream side of the module 756, while the male connectors 802 are the channel upstream side of the module 756. The module 762 further contains a peripheral device connector 808, for example, on the same side as the female connectors 804. The allowable size of the connector 808 is such that room remains for the necessary components, such as an IOC and device logic. Male connectors 806 are provided to continue to stacking capability. FIGS. 16C and 16D are top and bottom views of the module 762 to allow better visualization.

Of course, other connector arrangements could be used, but in any case a very compact daisychaining arrangement would result. This allows a very high function packing density, allowing even smaller computers to be developed, which at the same time are very flexible.

With the narrow data path width and high clock rate, packets can be transferred at a very high rate, with timing details to be described. Preferably one byte is transferred every clock cycle for a base raw bandwidth of 50 MB/sec. The A-Net message protocol is optimized for I/O applications. It supports all of the basic operations necessary for devices to respond to read and writes that are initiated by the system processors. These same capabilities are available to the I/O devices so that they can initiate or master their own operations. Additional capabilities are included to the minimum set to optimize the overall efficiency of I/O in a system context. The message protocol has been extended where necessary to enhance error detection.

An A-Net message is classified as either a Data Movement or a Control/Status message. Within the Data Movement class there are seven message types. The format for each message is determined by its class and type as follows:

| Class | Type | Format |
|---|---|---|
| Data Movement | read request (Read) | <command+size> <address> |
| " | read request sequential (ReadS) | <command+size> <address> |
| " | write request (Write) | <command+size> <address> <data> |
| " | write request sequential (WriteS) | <command+size> <address> <data> |
| " | compare and swap (CmpSwp) | <command+size> <address> <data> |
| " | exchange (Exch) | <command+size> <address> <data> |
| " | read response (Response) | <command+size> <data> |
| Control/Status | | <command+subcommand> |

The message class and type is used to determine the high order three bits (bits 7:5) of the first message byte, the Command Byte. For all Data Movement commands, the low order five bits (bits 4:0) of the Command Byte contain a Size Field. A packet's Size Field specifies the number of data bytes (1 to 32) to be transferred as a result of this command with the value encoded as one less than the actual number of bytes. For Control/Status messages, the low order five bits of the Command Byte are used for sub-command encoding. Command Byte encoding is:

| bit | | | | | | | | |
|---|---|---|---|---|---|---|---|---|
| 7 | 6 | 5 | 4 | 3 | 2 | 1 | 0 | Command |
| 0 | 0 | 0 | s | s | s | s | s | Response |
| 0 | 0 | 1 | s | s | s | s | s | Write |
| 0 | 1 | 0 | s | s | s | s | s | WriteS |
| 0 | 1 | 1 | s | s | s | s | s | Exchange |
| 1 | 0 | 0 | s | s | s | s | s | Compare and Swap |
| 1 | 0 | 1 | s | s | s | s | s | Read |
| 1 | 1 | 0 | s | s | s | s | s | ReadS |
| 1 | 1 | 1 | 1 | 0 | 0 | 0 | 0 | Channel Error |
| 1 | 1 | 1 | 1 | 0 | 0 | 0 | 1 | Read Error |
| 1 | 1 | 1 | 1 | 0 | 0 | 1 | 1 | Channel Reset |
| 1 | 1 | 1 | 1 | 0 | 1 | 0 | 0 | Address Size 32 |
| 1 | 1 | 1 | 1 | 0 | 1 | 0 | 1 | Address Size 40 |
| 1 | 1 | 1 | 1 | 0 | 1 | 1 | 0 | Address Size 48 |
| 1 | 1 | 1 | 1 | 0 | 1 | 1 | 1 | Address Size 64 |
| 1 | 1 | 1 | 1 | 1 | 0 | 0 | 0 | Little Endian |
| 1 | 1 | 1 | 1 | 1 | 0 | 0 | 1 | Big Endian |
| 1 | 1 | 1 | 1 | 1 | 0 | 1 | 0 | Idle |
| 1 | 1 | 1 | 1 | 1 | 0 | 1 | 1 | Request Retry |
| 1 | 1 | 1 | 1 | 1 | 1 | 0 | 0 | Real Time Command |
| 1 | 1 | 1 | 1 | 1 | 1 | 1 | 1 | Illegal Command | where sssss in bits 4 through 0 denote the Size Field.

When a message contains an address, the address is the next n bytes, the Address Bytes, of the message after the Command Byte. The Address Bytes are sent in big-endian order with the first address byte being the most significant. The address size can be different in different systems but must be specified before any data transfers. Four, five, six or eight byte addresses can be used, with specification required before any data transfers.

Addresses are used for routing of messages through various A-Net topologies. A message sent downstream on an A-Net channel will always be for the downstream device that receives the message or for devices attached to that downstream device. Addresses sent upstream are usually intended for accesses to system memory or for signaling interrupt/exception conditions, as described below.

Each A-Net device is expected to have at least one addressable register. The number of addressable locations in a device is dependent on device and system implementation. All A-Net topologies have a minimum of 4 KB of address space for each device. Another statement of this rule is that A-Net devices are addressable on 4 KB boundaries.

Messages containing data will have one or more bytes of data, the Data Bytes, following the Command Byte or, when present, the Address Bytes. The number of Data Bytes present in the message will be determined by the Size Field of the Command Byte. Data Bytes are always present on Write, WriteS, Exch, and Response messages. Consecutive Data Bytes have implied ascending address order.

An IOC or MIOC will not generally reorder messages received from a channel. Messages received on a downstream port will be sent to its upstream port in the order in which they were received. The IOC may send messages received from different downstream ports to its upstream port(s) in any order.

The Read and Reads commands are used by downstream devices to read from system memory or by upstream devices to read from I/O devices. Together they are referred to as Read Requests. The size field in the Read Request Command Byte indicates the number of bytes that are to be returned to the device issuing the read. The Command Byte for a Read Request is followed by the Address Bytes. Data returned in response to a Read Request is denoted by a Response Command Byte. If an error is detected in reading the addressed data it is indicated to the reader with a single byte Read Error Command Byte. The Reads command indicates that the next command will be a Read Request command to the sequential address after the present command, to allow for data prefetching.

Read Requests are split transactions allowing a channel to be used for other messages during the time that the requested data is being read from a device or from system memory. The limit on the number of outstanding Read Requests is system dependent. An attempt to issue more Read Requests than the implementation allows is indicated to the reader by a Retry during the Read Request that exceeds the implementation limit. Additionally, a Read Request command requires the MIOC to receive a completion status on the system bus before issuing another command from the same channel.

The Write and Writes commands are used by downstream devices to write to system memory or by upstream devices to write to I/O devices. Together they are referred to as Write Requests. The size field in the Write Request Command Byte indicates the number of bytes that are being written. The Command Byte for a Write Request is followed by the Address Bytes and the number of Data Bytes indicated in the Size Field. The Writes command is similar to the Reads command in that it indicates that the next command will be to a sequential address. Also a Write Request command is similar to a Read Request command in that it requires the MIOC to receive a completion status on the system bus before issuing another command from the same channel.

The Exch command provides a mechanism for coordination of activities in multi-threaded environments. A-Net devices are semi-autonomous devices generally having access to main memory. Once an I/O operation is initiated by a controlling processor, the A-Net device will begin a thread of operations to complete the I/O operation(s) that is asynchronous to the controlling processor's activities. Re-synchronization is accomplished with either interrupts or with Exch operations.

The A-Net Exch operation is defined to be a read-modify-write that is atomic at the addressee. The Exch command format is the same as for Write Requests. It also has the attributes of a Read Request in that it requires a Read Response or Read Error to the initiator. When an Exch command arrives at the addressee, the data is read and returned to the requestor, and the Exch data is then written to the addressed location.

The CmpSwp command is used to denote a write operation that will also return data. When an IOC receives this command, it should expect a Response to come from its upstream device. A CmpSwp may be followed by 2, 4, 8, 16, or 32 data bytes and the address of the write must be aligned to a word boundary. The data sent with the CmpSwp command are two equal sized operands. The first operand is a comparand and the second operand is a replacement value. A device receiving a CmpSwp command will read the contents of the addressed location and return that value in a Response. Then the device will compare this value to the comparand. If they are equal, the second operand is written to the addressed location. If they are different, the address location remains unchanged. If an odd address is detected or, if the size field is other than 2, 4, 8, 16 or 32, the device should return a Read Error command. A device not supporting the CmpSwp command should return a Read Error on receiving a CmpSwp command.

A Response message contains the data that was requested by a previously issued Read Request, Exch or CmpSwp command, collectively Requests. All responses sent downstream are provided in the order in which the Requests were issued upstream, with the converse case being also true. Upstream and downstream Requests are independent with no ordering required for the Requests in different directions. The IOC includes a read response FIFO queue to maintain this ordering. When an IOC receives a Read or Reads command, the IOC places the port number issuing the command into the queue. When a Response is received by the IOC, the first port number is popped from the FIFO and the Response is forwarded to that port.

If an upstream device detects a fault condition on its upstream port, it will notify all downstream devices connected to it by issuing a Channel Error message. Any device having downstream ports will send Channel Error to those downstream ports when it receives a Channel Error from its upstream port.

If an addressed device is unable to provide valid data in response to a Request, it will return a Read Error message to the channel from which the Request was received.

The Request Retry command is used by a device as a response to a request when the device is unable to respond in a timely fashion. If a device cannot send a Response within 256 channel clocks after a request is received, it must issue a Request Retry command.

The Idle command is used by an IOC to signal a channel with a pending request that the IOC is still waiting for a Response. An IOC must respond with either an Idle command or a Response no later than 256 channel clocks after a request is received. If an Idle command is sent, the IOC must again send an Idle command or a Response within 256 channel clocks.

Another command is the Real Time Command. This is a prefix command, which means that it precedes another command byte, and is used to indicate that this operation relates to real time or urgent data transfer. This command is used to increase the priority of the channel responding to the command out of sequence so that real time data transfers are expedited. Normal priority would be applied if two real time commands were simultaneously present in an IOC. The Real Time Command continues along with the related command to the receiving unit and any Response Command would be prefixed by the Real Time Command to expedite the data return.

The Address Size 32, Address Size 40, Address Size 48 and Address Size 64 Commands are used to set the size of the address that is to be used for data transfer commands. When a device is powered up, the interface is not required to be in any address mode. One of the Address Size commands is required before Read, Write, Exch or CmpSwp commands can be processed. A device receiving an Address Size command will propagate that command to all of its downstream ports.

The Big Endian and Little Endian commands are used to establish the byte ordering of multiple byte data. For a device that only operates as a slave, these commands establish the byte ordering of multiple byte data read from or written to the device. For mastering devices, this command also lets the device know the order of data and addresses read from control blocks in memory. One of the Endian commands is required before Read, Write, Exch or CmpSwp commands can be processed. A device receiving an Endian Polarity command will propagate that command to all of its downstream ports.

The Channel Reset command is used to restart a device or to clear a channel of any outstanding requests. A device receiving this command from an upstream port should clear its queue of ordered read requests and retransmit the command on all of its downstream ports.

The CLK signal provided by the upstream device will always be 50 MHz. Devices may have actual A-Net transfer clock rates of either 25 MHz, 50 MHz, or integer multiples of 50 MHz. Devices with transfer rates of 25 MHz will internally divide the 50 MHz A-Net CLK to derive their 25 MHz transfer clock. Devices with transfer rates of 50 MHz may use the A-Net CLK directly. Devices with transfer clock rates of integer multiples of 50 MHz will use clock multiplier circuitry (synchronized to CLK) to generate their internal transfer clocks. In these cases data values are actually transferred based on the internal clocks, the CLK signal just providing the synchronizing reference. A device will have the capability of transferring at a minimum of 50 MHz on any downstream port.

At system initialization, the 50 MHz channel clock (CLK) is generated for all A-Net devices. A delay from System Reset will elapse before channel initialization is initiated. This delay will provide adequate time for any phase-locked-loops in devices to stabilize. Each A-Net device will then enter an initialization phase. During initialization each A-Net device with a downstream connection will assert its RTS* line for one period of its maximum transfer rate. Within a predetermined number of cycles of the 50 MHz CLK, the downstream device will respond by asserting its RTS* for one period. The period of the response will be the longer of the period of the downstream device's maximum transfer rate or the period of the received pulse of the RTS* sent by the upstream device.

It is possible that the period of the RTS* sent by the upstream device for channel initialization may be of too short a duration to be "seen" by the downstream device. So, after the predetermined clock response period, the upstream device will step down its transfer clock rate by half (200 MHz to 100 MHz, 100 Mhz to 50 Mhz, 50 MHz to 25 MHz) and retry the initialization sequence until an initialization sequence at 25 MHz fails to produce a response. At this point, the upstream device will disable the CLK to the non-responding downstream device.

When an upstream device is communicating with a slower downstream device, the converse case is not possible, it is necessary to establish clock phase relationship for the divided clocks. For example, two devices that have "agreed" on a 25 MHz data transfer rate must insure that they are both making negative transitions on their divided clocks on the same negative edge of the 50 MHz CLK. The protocol defines that the upstream device will assert its RTS* on the rising edge of its transfer clock. Both CLK and RTS* are sent by the upstream device and arrive at the downstream device with minimal phase distortion. The downstream device may use the falling edge of RTS* from the upstream device to establish the correct phase relationship. Once this phase relationship is established during channel initialization, there should be no need to continue to use the upstream's RTS* to set the phase.

At transfer rates higher than 50 MHz, both the upstream and the downstream devices will use the 50 MHz CLK in their frequency multiplying circuitry. Since the duty cycle of the 50 MHz CLK is difficult to control accurately, the multiplying circuitry should only lock on the falling edge of CLK. If phase-locked loops are employed in the doubling circuitry, they should be low slew rate to minimize jitter. The CLK between devices should not be stopped when the transfer rates between devices exceed 50 MHz.

At high frequencies, the time of flight for the signals accounts for a significant amount of the total period of the transfer. At A-Net transfer rates of 100 and 200 MHz, the round trip delay time is too long to allow the channel to continue to operate synchronously without some compensation for the time of flight of the signals. This compensation is provided by requiring that upstream devices transferring at 100 MHz and 200 MHz will have CLKIN. CLKIN is CLK routed to the downstream device CLK pin and back to the upstream CLKIN pin. The upstream device will use CLKIN to derive its receive clock. If the upstream device is only capable of 50 MHz operation, CLKIN is not required and CLK may be terminated at the downstream device.

Systems using the protocol of the present invention can be designed to take advantage of stopping the A-Net CLK on one or more channels. Being able to stop the A-Net channel clock can reduce the power consumed by infrequently used I/O devices, or by any I/O device when the system is in hibernation-mode, and by channels with no devices to reduce RFI. Stopping clocks will also aid in "hot plugging" new I/O devices. When conditions described below are met to allow a channel clock to stop, the clock will freeze in the "pulled-up" state. If the IOC needs to access the I/O device it will merely restart the clock. If the I/O device needs to access the system (via an IOC), then it must activate its RTS* signal (asynchronous to the IOC) at least long enough for the IOC to sample the CTS signal through its metastable avoidance circuitry and get the channel clock started again.

There are several conditions that will allow a channel clock to stop during run-time. The devices must be fully static, or provide their own clock to keep internal registers alive. There must be an alternate means for an I/O device to activate its RTS* signal, without using the channel clock, when it needs to request access of the system while the clock is stopped. All devices downstream must be capable and willing to have their channel clock stopped. A timeout can be enabled for each channel that stops the clock after an arbitrarily chosen period of idleness. The default is preferably to have no timeout.

In hot-pluggable systems where I/O devices can be installed or replaced while the system is on, there must be a means for an I/O device to request that the channel become idle and undriven. This could be via an interrupt that tells the system to disconnect the I/O device. The I/O device cannot be disconnected and removed until all pending accesses to and from the device are satisfied or aborted.

When no device is installed, there will be no pullup on the channel clock line, and there will be nothing driving the CTS signal (other than a pull-up). Since the clock cannot transition high without a pullup, the clock trace cannot radiate RFI even if the IOC output was still active. To conserve power, the IOC should sense that the clock changing and stop driving the clock and all other channel signals until the IOC CTS signal is sensed driven low by a device.

When a new device is plugged-in and ready to interface to the system, its RTS* signal is set active telling the IOC to interrupt the system and install the device.

Hibernation allows a system to go into a very low power mode and then wake up later in the same state that it was in before. There would be absolutely no I/O device activity allowed to the system and minimal activity to its external interfaces. The idea is that by stopping the clock, the system state will remain unchanged. The IOC will know whether the device can allow the clock to stop or not, and whether there are pending accesses that would need to be satisfied, so when hibernation mode finally starts, the clock would freeze the I/O devices in whatever state they happened to be in. There may be devices that are static and use only the channel clock for their internal state machines. This type of device can hibernate but cannot have its clock stopped during idle times, since stopping the clock would prevent remote activity and there would be no way for the device to request that the clock be restarted.

Odd parity is used to detect errors in the transmission of packets across a channel. The use of parity is not intended to detect errors in other parts of communicating devices. The most common type of channel failures are expected to be stuck-at failures and transient single bit failures. Parity, in combination with the A-Net protocol and signaling techniques, is designed to allow detection of either of these types of failures.

An odd number of stuck-at-zero or stuck-at-one conditions on the data/parity lines will be detected with a parity check by the receiver during normal transmission. All even (and odd) stuck-at-zero cases will be detected during a stuck-at-zero cycle. The stuck-at-zero cycle is defined to be the idle cycle immediately following a transmission. During this cycle, ports at both ends of a channel are required to turn off output drivers for the data/parity lines, allowing them to float high. Sampling the data/parity lines on the clock following a stuck-at-zero cycle by ports at both ends of the channel will reveal all stuck-at-zero conditions present on the data/parity lines at that time.

A stuck-at condition (zero or one) on a port's RTS* line will be detected by having each port sample its own RTS* line after every transition. If the sampled value is not equal to the value driven on the previous clock, an error condition exists.

Detection of a stuck-at-zero condition on a port's CTS line is accomplished by the port realizing that the CTS line has been held at a logical zero longer than the maximum packet length, which should not happen even during back-to-back transfers. The detection of a stuck-at-one condition on a port's CTS line, which keeps the port from receiving any messages, will be detected with a Read (or Reads or Exch) timeout error.

A device detecting an error on a channel must signal the device on the other end that an error condition exists. This is accomplished by pulling all channel lines (except CLK) low for a predetermined number of 50 MHz clocks. After signaling an error condition, a device must wait until CTS and RTS* are high before proceeding. A device signaling an error on an upstream channel must broadcast a Channel Error message to its downstream channels. The device will then reset. All devices receiving a Channel Error message must broadcast that message to downstream ports and reset. Devices signaling an error on a particular downstream channel must send a Read Error message upstream for each outstanding Read Request (and ReadS and Exch) on that channel. These devices must then inform the system of the error.

A node receiving a Read Request is required to return some indication that the Read Request was received within a predetermined number of clocks. The purpose of this indication is to insure that the connection between devices is still operational and that some channel action by the receiver is still possible. This avoids the possibility of a long or infinite delay on a Read Response that might hang the system. This indication can be provided in one of two ways. The first is by providing the requested data as a Read Response. If the accessed device cannot provide the Read Response within the predetermined number of clocks, it should perform some operation that involves assertion of it RTS*, such as issuing a message or providing a Request Retry, as described above.

A node sending a Read Request must maintain a Read Request Timeout counter and a count of Read Requests (Read Request Counter) issued on a channel. The Read Requests Counter is incremented when a Read Request, or Compare and Swap, or Exchange command is sent on a channel and decremented when a Read Response or Read Error is received from that channel. Any channel activity by the port receiving the Read Response, Request Retry, or Read Error will reset the Read Request Timeout. The counter will continue to run after a reset as long as the Read Request Count is non-zero. In the event that the Read Request Timeout expires, the requesting node will issue Read Error messages (one for each pending read on the channel) back to the original requestor.

The functions of an A-Net Port (ANP) are to comprehend the channel protocol, normally by use of a state machine; to decode the received command byte for tracking purposes and to provide the command information to associated control logic; to encode packets in case of reset and errors; to check for parity errors of the received messages, and to provide parity for transmitted messages.

Figure 3:
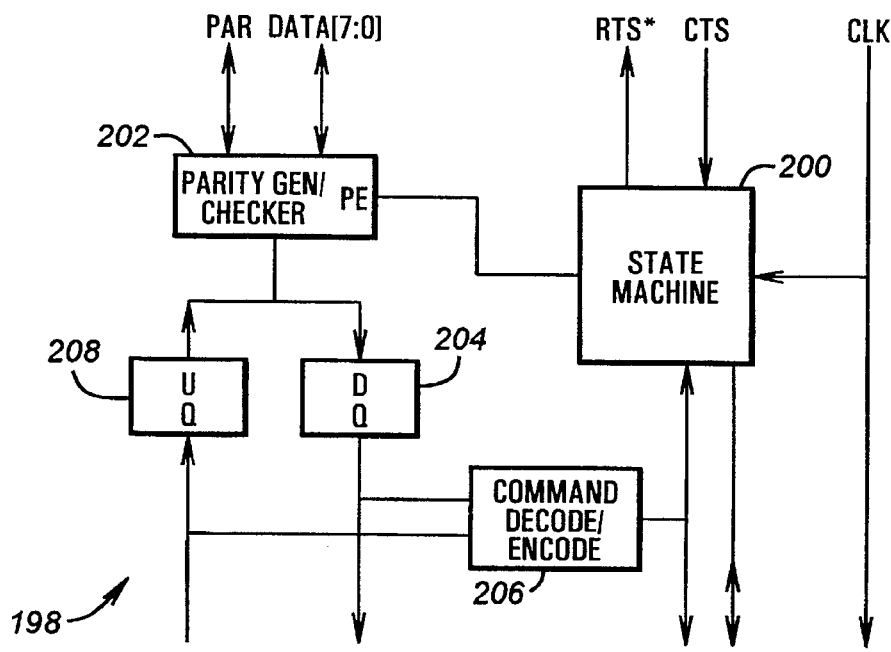
FIG. 3 is a block diagram of an input/output communication port as used in the computer system of FIG. 1.

A block diagram of an A-Net port 198, particularly a downstream port, is shown in FIG. 3. A state machine 200 receives the RTS*, CTS and CLK signals to aid in the handshaking with the other port. A parity generator/checker 202 is connected to the DATA<7 . . . 0> and PAR signals. When receiving, the parity generator/checker 202 checks the parity of the received data and transmits an error from its parity error (PE) output to the state machine 200 for synchronization and transmission to the IOC control logic. On transmissions the parity generator/checker 202 develops the parity value and drives the PAR signal. A receive latch 204 is connected to the parity generator/checker 202 to latch received data before transmission to the receive message buffer associated with the ANP. Command decode/encode logic 206 is connected to the output of the receive latch 204 to allow decode of the command byte, with the outputs of the decode/encode logic 206 being provided to the state machine 200 to allow cycle length tracking and to the IOC control logic, and to the inputs of an transmit latch 208 to allow command output. The transmit latch 208 receives data from the transmit message buffer associated with the ANP and the decode/encode logic 206 and provides it to the parity generator/checker 202. The state machine 200, through signals not shown, controls the data input and output by the latches 204 and 208, the direction of the parity generator/checker 202 and the decode/encode timing of the command decode/encode logic 206.

Figure 4:
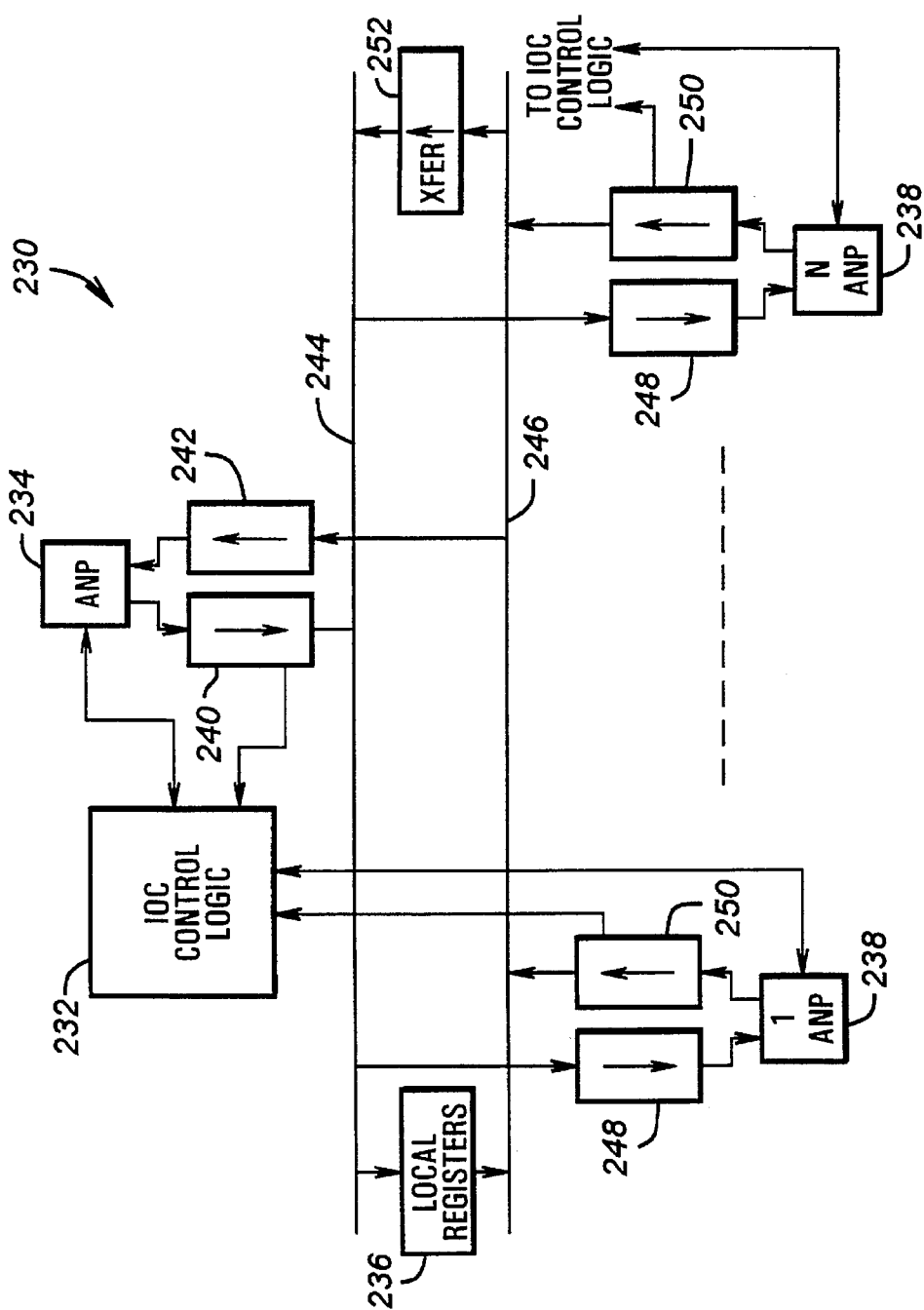
FIG. 4 is a block diagram of an input/output concentrator of FIG. 1.

An IOC 230, as shown in FIG. 4, includes control logic 232, a set of local registers 236; an upstream port 234 and multiple downstream A-Net ports 238. For a simple IOC 230, the upstream port 234 and all of the downstream ports of IOCs are A-Net ports and comprehend the channel protocol.

The functions of the IOC control logic are to decode the address of a received message from any port to decide whether the message is for the on-board registers of the IOC or for others nodes located below the IOC, to queue commands from all ports, to schedule received commands from all ports and control the various transmit and receive buffers, to encode messages in case of exception conditions, and to synchronize varying transfer rates at the downstream ports.

An exemplary organization of an IOC 230 is in FIG. 4, based on bus transfer between the upstream and downstream ports, but other configurations, such as a multiplexed/demultiplexed structure, crosspoint organization or others could also be used. The upstream port 234 has associated with it a receive message buffer 240 and a transmit message buffer 242. The receive message buffer 240 is connected to the control logic 232 to allow for the address decode of the message. The message buffers 240 and 242 are FIFOs. The upstream port 234 is connected to the control logic to allow error, command and other values to be communicated. The output of the receive message buffer 240 is provided to a receive bus 244. The input of the transmit message buffer 242 is connected to a transmit bus 246.

The various downstream ports 238 are coupled to the receive and transmit buses 244 and 246. Each downstream port 238 has associated transmit and receive message buffers 248 and 250, respectively. The input of the transmit buffer 248 is connected to the receive bus 244, while the output of the receive buffer 250 is connected to the transmit bus 246. The receive message buffer 250 and the downstream port 238 are both connected to the control logic 232 for like reasons as the upstream port 234. Only the first and Nth downstream ports 238 are shown in FIG. 4, but it is understood that all of the ports are identical.

A transfer gate 252 has its inputs connected to the transmit bus 246 and its outputs connected to the receive bus 244 to allow peer-to-peer transmission between the various devices downstream of the IOC 230. The local registers 236 have their inputs connected to the receive bus 244 and their outputs connected to the transmit bus 246. Not shown in FIG. 4 for clarity are the various control lines from the control logic 232 to latch and output enable the various buffers, registers, and gates. Also not shown in FIG. 4 for clarity is the clocking logic used to receive and generate the necessary clock signals to advance state machines and shift registers and synchronize latching and output enabling of the various devices. It is understood that the upstream and downstream ports may have different basic clock frequencies.

The illustrated IOC uses FIFO's for each port, but only a single set of FIFO's is required in a minimal configuration.

The MIOC 120 does similar functions as the IOC 230 except that the upstream port of the MIOC 120 is designed to interface with the host bus 106 and except for the following functions. The MIOC 120 decodes the messages from the downstream devices and converts them to respond to the processor or to access the system memory 112, encodes the memory responses into response messages to the requested devices, decodes host bus 106 accesses to respond to A-Net addressing as well as to be coherent with the CPU caches, encodes the processor requests into messages for the devices, and interrupts the processor when errors are reported from the downstream devices.

The FIFOs for each port may be relatively short, such as the length of the longest message, or can be much longer to act as prefetch and write posting buffers. The IOC can monitor the ReadS and WriteS Commands. When a ReadS Command is received, the IOC, especially the MIOC, can obtain additional information from sequential locations before the next Read Command is received. This prefetching reduces arbitration sequences, allowing a performance increase. It is especially helpful when the block size of the requested device is larger than the A-Net packet block size. A new Reads Command need not be issued upstream by the prefetching unit until the prefetched data has been transferred. Similarly, write posting can be performed using the WriteS command and a longer FIFO. Several sequential packets can be stored in the FIFO and the entire chain is not transmitted until the FIFO is full or a non-WriteS Command is received. This write posting also reduces the number of arbitrations necessary, increasing overall system performance. The IOC control logic 232 contains the logic necessary to implement and control the prefetching and write posting.

Preferably one additional feature can be performed by the IOC control logic 232. As each channel within an IOC is arbitrated, it is desirable to balance the devices across the various IOCs. This balancing can be performed during development for permanently attached A-Net devices or periodically for slotted A-Net devices. To facilitate this balancing, performance monitoring capabilities can be included in each IOC and device. An exemplary way this can be done is to provide a counter for each channel. The counter increments on backoffs or retries on the channel, either upstream or downstream. Alternatively, the counters can count the length of the waiting periods of transfers on the channels. The counters can be cleared by a request from the controlling processor. Operations would be performed for a desired sampling period and then the controlling processor would read the various counters. The controlling processor would then review the counts and suggest optimal locations for the various devices. To reduce possible channel latency problems affecting the counter values, the data can be provided out-of-band over a serial link. Preferably two highly used devices would not be installed on one IOC while another IOC at the same level had none. Further, this would also allow movement of devices among tree levels to balance loading at each level.

An IOD is used to interface a peripheral device or a subsystem, such as a SCSI to the A-Net, or used to drive an externally located A-Net subsystem via a non-A-Net interface. An IOD only has an upstream A-Net port with associated ANP logic and register set, and clock logic if necessary. The downstream portion corresponds to the interface needed for the particular peripheral device. The IOD generally has circuitry to perform the desired peripheral function. The IOD control logic preferably is a command list processor and retrieves the command list that processor created, encodes messages to send upstream to "execute" the command-list, and processes the received messages. As noted above, both the IOC 230 and the IODs have registers. Certain registers are used for operation of the protocol and these are described below.

Figure 5:
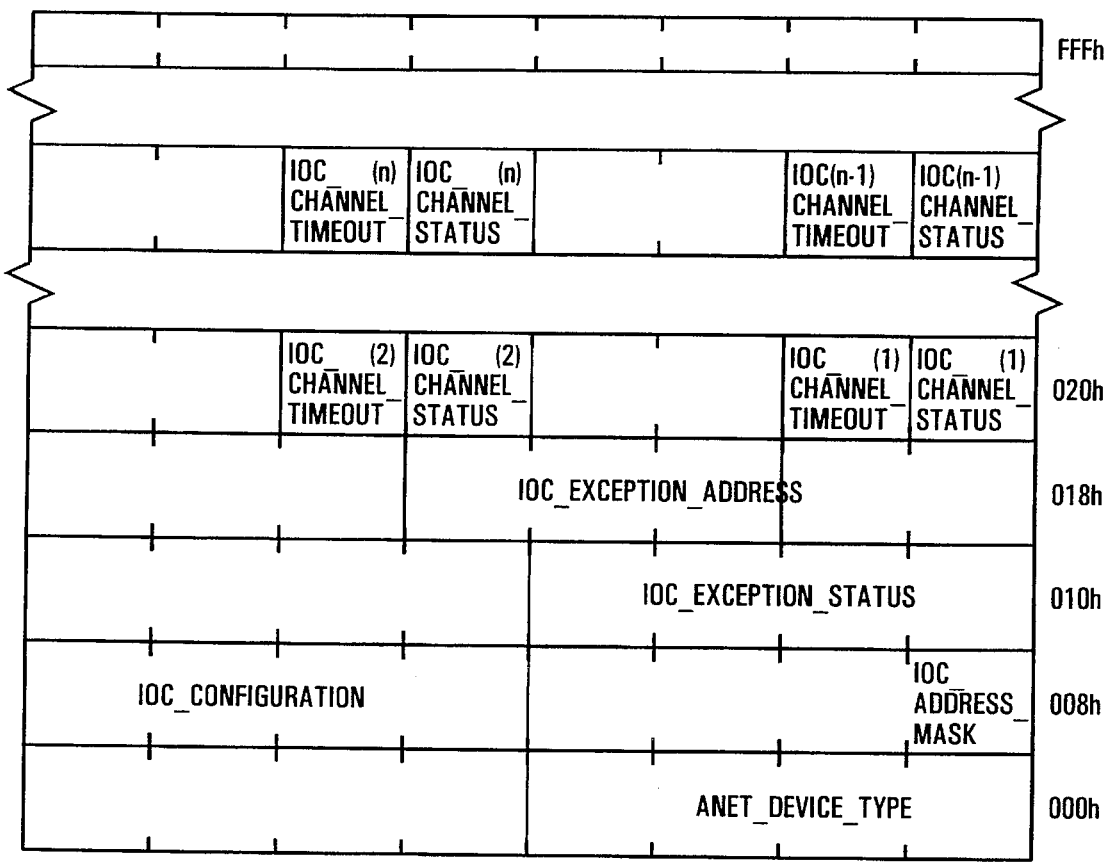
FIGS. 5 and 6 are register maps for input/output concentrators and devices of FIG. 1.

FIG. 5 illustrates the local registers in the IOC 230. The registers local address and operation are as follows.

A-Net_Device_Type: address 000h

This 32-bit register contains a unique device type indicator used during the boot process (described below) to determine the topography of the current A-Net implementation and its associated devices. The bits define the presence of Option ROMs, 3 character manufacture code, 3 hex digit product number, and a 1 hex digit product revision number as follows:

| Byte | 3 | |
|---|---|---|
| | Bit 7 | Option ROM (Present if Set) |
| | Bit 6:2 | Character 1 |
| | Bit 1:0 | Character 2 (upper bits) |
| Byte | 2 | |
| | Bit 7:5 | Character 2 (lower bits) |
| | Bit 4:0 | Character 3 |
| Byte | 1 | |
| | Bit 7:4 | Product Digit 1 |
| | Bit 3:0 | Product Digit 2 |
| Byte | 0 | |
| | Bit 7:4 | Product Digit 3 |
| | Bit 3:0 | Revision Digit |

Supported characters are ASCII values 41h (A) through 5Ah (Z), and compression is achieved by discarding the three most significant bits of a byte. Thus A is 00001b and Z is 11010. Remaining digits are in standard hexadecimal representation.

IOC_Address_Mask: address 008h

This 8-bit register is set at configuration/boot time. It is used to support geographical addressing of the IOC hierarchy. Each IOC's address mask will be set based on the system topology to allow it to determine if later cycles are addressed to it or to devices or IOCs connected to one of its channels.

IOC_Configuration: address 00Ch

This 32-bit read only register supplies the boot/configuration information about the particular implementation of this IOC and includes, for example, the number of downstream channels and their activity status.

IOC_Exception_Status: address 010h

This 32-bit register reflects the exception or error condition that caused the IOC to perform an operation to the IOC_Exception_Address.

IOC_Exception_Address: address 018h

This register is encoded at configuration/boot time by the appropriate processor to indicate the address of the controlling processor's programmable interrupt controller (PIC) and interrupt level under error or exception conditions. This register has a length as indicated by the Address Size command.

IOC_Channel_Status: Base address 020h (Channel 1)

This 8-bit register contains values representing the status of the particular IOC channel.

Bit 3 Enable/Disable Channel (Enabled if Set—default)
Bit 2:0 Transfer Clock Rate
  0→25 MHz
  1→50 MHz
  2→100 MHz
  3→200 MHz IOC_Channel_TimeOut: Base address 022h (Channel 1)

This 8-bit register contains integer values representing the number of contiguous idle clocks before an IOC will stop the clock of a given channel.

The IOC_channel_status and IOC_channel_timeout registers for the remaining channels follow successively, until registers have been provided for all the channels in the IOC.

Figure 6:
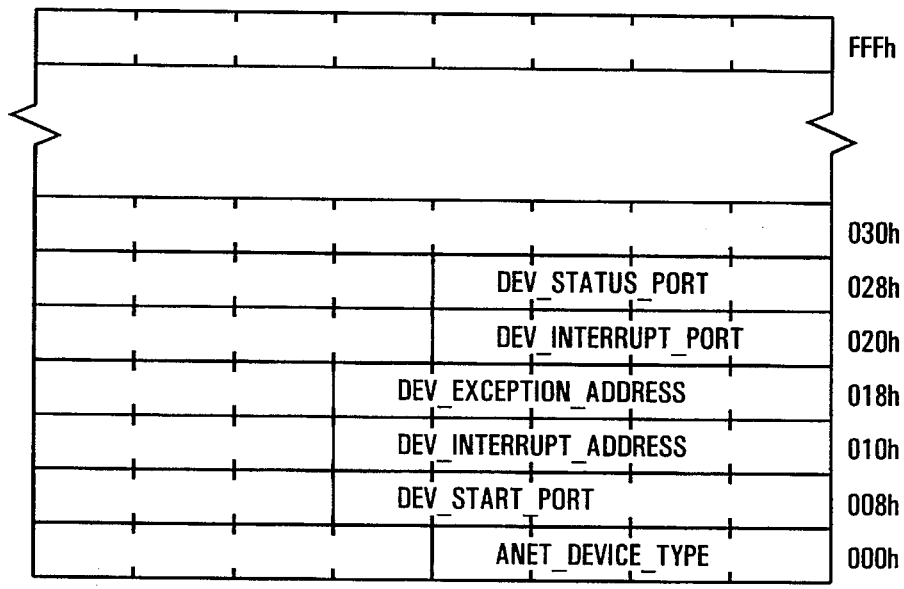

FIG. 6 illustrates the local registers in an IOD used for A-Net communications. The name, address and operation are as follows:

A-Net_Device_Type: address 000h

This 32-bit register contains a unique device type indicator used during the boot process to determine the topography of the current A-Net implementation and its associated devices. Bits 31 to 0 define the presence of Option ROMs, 3 character manufacture code, 3 hex digit product number, and a 1 hex digit product revision number as follows:

| Byte | 3 | |
|---|---|---|
| | Bit 7 | Option ROM (Present if Set) |
| | Bit 6:2 | Character 1 |
| | Bit 1:0 | Character 2 (upper bits) |
| Byte | 2 | |
| | Bit 7:5 | Character 2 (lower bits) |
| | Bit 4:0 | Character 3 |
| Byte | 1 | |
| | Bit 7:4 | Product Digit 1 |
| | Bit 3:0 | Product Digit 2 |
| Byte | 0 | |
| | Bit 7:4 | Product Digit 3 |
| | Bit 3:0 | Revision Digit |

Supported characters are ASCII values 41h (A) through 5Ah (Z), and compression is achieved by discarding the three most significant bits. Thus A is 00001b and Z is 11010. Remaining digits are in standard hexadecimal representation.

Dev_Start_Port: address 008h

This register is written by the processor which has just enqueued a command packet for the device in system memory. The register has the length indicated by the Address Size command. Note that the simple act of writing the port with any value will minimally cause whatever series of events is required to cause the device to seek out the command list in main memory. In implementations with Option ROMs at boot time, this value must be the address where the initial 4K block is to be transferred. In other implementations, the device designer and device driver designer may implement extensions using the data value. Conventionally, writing the value will cause the device to issue a command list read request at that address.

Dev_Interrupt_Address: address 010h

A-Net devices that may cause interrupts back to the system bus implement this register. The Interrupt_Address_Port is encoded at configuration/boot time by the appropriate processor to indicate the address of the controlling processor's PIC and interrupt level. This register has the length indicated in the Address Size command.

Dev_Exception_Address: address 018h

A-Net devices that wish to report an error or exception condition separate from the normal interrupt back to the host bus 106 implement this register which is encoded at configuration/boot time by the appropriate processor to indicate the address of the controlling processor's PIC and interrupt level under error or exception conditions. This register has the length indicated in the Address Size command.

Dev_Interrupt_Port: address 020h

This port receives a standard A-Net write which will cause an interrupt to the designated device. Note that no specific value must be written to the port. The simple act of writing the port with any value will minimally interrupt the device.

In addition to the various IOC's and IOD's having registers, the PIC 108 is also memory mapped and contains a number of registers containing interrupt vectors or levels. Each level is a separate memory address, so that the PIC 108 then occupies a range of memory space. The values in the Exception_Addresses and the Interrupt_Address correspond to these locations.

Dev_Status_Port: address 028h

This 32-bit read/write register contains the following information:

| | | |
|---|---|---|
| Bit 31:12 | Reserved | |
| Bit 11 | Gross Error (if set device is in an error state) | |
| Bit 10 | Endian (Clear if Little Endian default) | |
| Bit 9 | Boot Mode (if set device enters boot mode) | |
| Bit 8 | Reset (if set device enters reset state) | |
| Bit 7:3 | Reserved | |
| Bit 2:0 | Transfer Clock Rate | |
| | 0 → 25 MHz | |
| | 1 → 50 MHz | |
| | 2 → 100 MHz | |
| | 3 → 200 MHz | |
| Programmable Interrupt Controller (PIC): | | base address XXXXXXXXh |

The PIC 108 decodes the address range starting at address XXXXXXXXh and extending to equal the number of possible interrupt levels to addresses. For example, the address range for 256 interrupt levels would be 00000000h to 000000FFh, for a base address of 00000000h. The PIC 108 implements an operating system settable register for each of the addressable interrupt levels. The register value is returned to the processor during the interrupt acknowledge sequence as the interrupt vector. This allows the operating system to modify the hierarchy of interrupt vectors from the processor's point of view.

The A-Net architecture encompasses three forms of addressing: downstream, upstream, and peer to peer. Each address type utilizes a geographical addressing scheme allowing for maximum flexibility. Each IOC or device is guaranteed to have at least its own 4k addressable region. The general format for geographical addresses that are used during the addressing of A-Net devices is shown below.

| n | (n–w) | x | 0 |
|---|---|---|---|
| System Dependont | Mask/Address | Address | |

The (n-w) most significant bits (MSbs) of the address are system dependant. The x least significant bits (LSbs) are guaranteed address bits with a minimum size of 12 bits, thus giving each IOC and device its minimum 4k page of memory. The remaining (n–(w+x)) mask/address bits serve multiple purposes based on the type of addressing and will be described further below. To illustrate addressing, the address format shown will implemented with n=40, w=16, and x=12.

Downstream addressing is defined as addresses (and associated other information) flowing from the host bus 106 to the MIOC 120 and down through the levels of IOCs 140 and 146 to reach a device. Certain conventions cover addressing. The MIOC 120 has the ability to recognize host bus 106 cycles intended for the A-Net structure, and is a master on the host bus 106. When an IOC other than the MIOC 120 sees an address, it is for the IOC or one of its channels. When a device sees an address, the address is for it. Each IOC has up to $2^n-1$ channels, with the downstream channels numbered 1 to $2^n-1$. Logical channel 0 is defined as the IOC's local address space.

For purposes of address decoding, address Byte/Bit Numbering is as follows:

| Byte no.: | 0 | 1 | 2 | 3 | 4 |
|---|---|---|---|---|---|
| Bit no.: | 0123 4567 | 0123 4567 | 0123 4567 | 0123 4567 | 0123 4567 |

The 8-bit IOC_Address_Mask register of each IOC has the following format:

x x x N N b b b

Where: N is the byte number and b is the bit number. The number of bits N defined in this register corresponds to the number of address bytes available to address a device. The number of bits in the "b" field corresponds to the number of devices attached to an IOC including the IOC itself. Three bits allow up to 7 devices to attach to an IOC. Seven devices is considered a preferable limit as that keeps the pin count of the IOC chip at a cost effective level. Bits 4 and 3 indicate the byte, numbered from Most Significant to Least Significant, i.e. bits 39 - 32 represent transfer byte 0. Bits 2 through 0 indicate the Most Significant bit of the mask field, with the bits numbered in reverse order, bit 7=0 and so on.

During the boot/configuration of the system, the system boot master processor sets the IOC_Address_Mask for each IOC in the A-Net configuration. From that time forward the appropriate portion of each downstream address is used to determine if the address is for the IOC itself, the defined mask bits in address=0, or one of its channels, the defined mask address bits being greater than 0. In the event that the value is not in the range of channels, the IOC will generate an Exception to the appropriate processor as specified in the IOC_Exception_Address register with the appropriate bits of the IOC_Exception_Status register set. For the sample system shown in FIG. 1, the IOC_Address_Masks would be set as follows:

| | | |
|---|---|---|
| MIOC 120 | → | XXX01000 (bits 23–21, start: byte 1, bit 0) |
| IOC 140 | → | XXX01011 (bits 20–19, start: byte 1, bit 3) |
| IOC | → | XXX01011 (bits 20–19, start: byte 1, bit 3) |
| IOC 146 | → | XXX01101 (bits 18–17, start: byte 1, bit 5) |

Note that IOC 140 and the next listed IOC, which is provided only for example and is not shown in FIG. 1 but is assumed to be connected to the MIOC 120, have the same value in the IOC_Address_Mask register. This does not present a problem as each IOC will only see addresses intended for it or its children, by definition. Also, the bits of the mask/address field that are not used for the geographical map in the parent IOC may be used by the downstream devices as address bits.

As an address enters the MIOC 120, it is checked and passed on to the appropriate channel. For instance, an address with bits 23-21 set to 3 would cause the address to be relayed to IOC 140. Via this method, the address finally arrives downstream at the device for which it is intended, the device automatically assuming that the address is intended for it.

Upstream addressing is defined as a device releasing an address that moves through the A-Net hierarchy and out to the system bus. In this case, all the mask/address bits may be used as address bits in addition to the normal 12 bits, allowing the maximum addressable page on the system bus.

Peer-to-peer addressing comprises both upstream and downstream addressing, and is defined as an A-Net device performing a write operation to another A-Net device without the intervention of the host bus 106. It is assumed that the device is aware of the geographical or downstream address that it must release to reach the appropriate destination. Each IOC must be able to interpret this incoming 'upstream' address and determine if it should be the IOC to turn the packet 'downstream'. This is facilitated by a IOC_Top_Loc or IOC topography location register which contains the topographical location of the given IOC. The IOC will compare the incoming 'upstream' address with the IOC_Top_Register, and if the mask information indicates that the incoming packet is for the IOC or one of its channels, will turn the packet back downstream.

Using a 40-bit address, a system can use a maximum of 28 bits to address a device and the remaining 12 bits to address the memory within the device. The most significant 28 bits of the address essentially route data packets through the IOC tree to a specific I/O device and the 12 remaining bits address memory within that device. A device may require more than 12 bits of address space to fully access its memory. In this case less than 28 bits are used to route the data to the device and the remaining bits are used to address the device's memory.

The A-Net structure lends itself well to the use of geographical addressing to access the major components, such as the memory 112, the graphics controller 114, the MIOC 120 and so on. For this discussion assume that the most significant address byte defines the system geographical address. Assume that the MIOC 120 resides at the geographical address defined by byte 0 above being 15h. Assume also that the MIOC's 120 IOC_Address_Mask register contains a value of 08h (0000 1000b). From the address mask register template above, bits NN are 01 and bits bbb are 000. This means that the MIOC 120 will use Byte 1, bits 0, 1 and 2 to begin its address decode.

The decoding scheme defines the host IOC as device 0 and the remaining devices on the IOC links as devices 1 to $2^n-1$, where n is the number of bits "b". For this example the MIOC 120 registers reside in the address space beginning 0001 0101 000x xxxxb in bytes 0 and 1 respectively. Device 1 of the MIOC 120 has its address space beginning at 0001 0101 001x xxxxb. This continues until device 7, which has the same byte 0 value, 0001 0101b, but byte 1 equals 111x xxxxb. The MIOC 120 and its devices use the remaining 29 bits to address memory in their own address spaces.

This example continues with IOC 140 attached to the MIOC's first link. This corresponds to device 2 and will receive all data packets whose address bits begin with 0001 0101 010x xxxx . . . xxxxb. To take advantage of its entire address range, the IOC 140 will begin its decode at byte 1, bits 3, 4 and 5. The IOC's address mask register therefore contains 0000 1011b. This defines the IOC 140 local address space, as device 0, to begin at 0001 0101 0100 00xx . . . xxxxb. The first device's address space begins at 0001 0101 0100 01 xx . . . xxxxb and so on until the seventh device. Thus the IOCs closer to the MIOC 120 control larger address spaces, while the IOCs farther from the root control smaller address spaces.

An A-Net transfer can be initiated by a processor or any A-Net node. The processor reads from or writes to devices during system initialization and system management, such as, interrupts due to error conditions. Most processor initiated transfers are small packets, usually to the Start_Port, for example, to direct to a command list. The majority of the routine A-Net transfers are initiated by the MIOC 120 and the devices. Intermediate-level IOCs can also initiate transfers in case of error conditions.

For processor device transfers, the processor informs a device which transfer types are to be initiated via a command-list. A command-list consists of device specific commands. After a command-list is set up by the processor, it notifies the corresponding device to read the command-list. The device reads the command-list, fully or partially depending on the device implementation, into a local command list buffer for processing.

A device can initiate a transfer to read/write the memory 112 or another device. The device to memory transfers are best described by using examples. The following paragraphs demonstrate how a device local command list is executed to transfer data to and from the memory 112. It is assumed that there are no errors during these transfers.

Assume that IOD-1 has only one upstream port and the local command list of IOD-1 consists of the following commands . . .
Entry-11: Device-Read . . . (read data from the peripheral device)
Entry-12: Write to 00FFFE0000h, 2048 bytes
Entry-13: Read from 00FFF20000h, 4100 bytes
Entry-14: Device-Write . . . (write data to the peripheral device)

For all A-Net transfers, the transfer width for each port (and channel) is 8-bits and the maximum data length of a packet is 32 bytes. The number of A-Net packets required to complete the Entry-12 and Entry-13 commands are

| Packets | Total # of Bytes | # of A-Net |
|---|---|---|
| Entry-12: | 2048 | 64 32-byte packets |
| Entry-13: | 4100 | 128 32-byte packets + 1 4-byte packet |

For Entry-12, IOD-1 encodes 64 packets with each packet containing the Write command, the size, the address and the associated 32-byte data:

| Packet # | Size | Address |
|---|---|---|
| 1 | 32 | 00FFFE0000 |
| 2 | 32 | 00FFFE0020 |
| 3 | 32 | 00FFFE0040 |
| . . . | | |
| 64 | 32 | 00FFFE07E0 |

These write messages will be received by the MIOC 112 and the associated data will be written to the memory by the MIOC 112.

For Entry-13, IOD-1 encodes 129 packets, with each packet containing the Read command, the size and the address;

| Packet # | Size | Address |
|---|---|---|
| 1 | 32 | 00FFF20000 |
| 2 | 32 | 00FFF20020 |
| . . . | | |
| 128 | 32 | 00FFF20FE0 |
| 129 | 4 | 00FFF21000 |

After the MIOC 120 receives the read messages from IOD-1, it will read the memory starting from the address 00FFF20000. The MIOC 120 will then encode read response messages along with the read data and send them back to IOD-1. Since each IOD-1 read request received by the intermediate IOCs is satisfied with an MIOC 120 read response message in order, the read response messages do not need addresses. IOD-1 will eventually receive 64 read response messages, each with 32 data bytes and one read response message with 4 data bytes.

Preferably all device-to-device or peer-to-peer transfers between two devices are via write messages. The processor is responsible to build the command list for the devices, so that the device that has the data will write to the requesting device. All transfers are strongly ordered within an IOC, both requests/responses from/to a port and requests/responses from/to the ports.

The A-Net system supports a fully symmetrical multi-processing interrupt model for system master to system master, system master to A-Net, and A-Net to system master interrupts. This scheme allows system masters to interrupt each other, a system master to interrupt a device on the A-Net, or an A-Net device to interrupt the appropriate processor. The interrupt vector implementation is flexible to allow system software designers to implement hierarchial or linear, or both, interrupt levels at their discretion.

The PIC 108 interfaces to the host bus 106 and decodes all interrupts intended for its processor, as described above; determines if it should interrupt the processor with the current pending interrupt; supports the interrupt function to the processor and supplies the interrupt acknowledge interface to the processor.

The interface to the host bus 106 is primarily implementation dependant. Minimally, the PIC 108 must be able to decode addresses released onto the host bus 106 to determine if it is the intended recipient. Note that the host bus 106 cycle may be a read, write or exchange. The device initiating the sequence will not expect valid data to be returned, but uses the read and exchange operations as synchronization tools. The PIC 108 decodes the address range starting at an implementation specific base address and extending to equal the number of possible interrupt levels to addresses, as noted above. The PIC 108 sends the highest ranked pending interrupt to the processor during the interrupt acknowledge cycle(s). Ranking is determined by address, with the base address representing the lowest priority interrupt. For instance, if a level 15 interrupt causes the PIC 108 to assert the interrupt line to the processor, and a level 23 interrupt arrives before the processor begins the interrupt acknowledge sequence, the level 23 vector will be written to the processor. The PIC 108 implements an operating system settable register for each of the addressable interrupt levels, with the register value to be returned to the processor during the interrupt acknowledge sequence.

Each A-Net device, including IOCs, that requires an incoming interrupt implements a Device_Interrupt_Port at local address 020h, as described above. This port receives a standard A-Net write, which causes an interrupt to the designated device. Two possible schemes to remove the interrupt condition are a hardware oriented interrupt acknowledge to the local port or a return interrupt to the appropriate system master causing a clearing operation to the port.

A-Net devices that may cause interrupts back to the host bus 106 implement a port to support this operation. The Interrupt_Address_Port as described above provides this function. All IOCs and all devices that wish to report an error or exception condition separate from the normal interrupt back to the host bus 106 implement a port to support this operation. The Exception_Address register as described above provides this function.

If a system master wishes to interrupt another, system master, all the interrupting system master need do is perform a read operation to the other System Master's local PIC address. For a system master to interrupt an A-Net device, the system master generates a write to the appropriate address for the given device and the Device_Interrupt_Port in the device's local address space. This will cause an interrupt to the device. For an A-Net device to interrupt a system master, the A-Net device simply performs a read using the address supplied in the Interrupt_Address register.

Moving now to the various cycle types that make up the A-Net signaling protocol, all A-Net ports sample their inputs on the falling clock edge. Upstream ports drive their signals on rising edges. Downstream ports drive on falling edges. A port will not drive any signal due to any input until one cycle after that input is sampled.

The timing diagrams are FIGS. 7A–13 and represent 50 MHz operation. In the timing diagrams the letter "C" represents command byte, the letter "A" represents address bytes and the letter "D" represents data bytes. The "C", "A", and "D" are prefixed by a letter "U" for an upstream port sending or a letter "D" for a downstream sending, e.g., "UA" means an address byte sent by the upstream port. Device and IOC state indications are explained by the state machines of Appendix A, which show idle, transmit and receive states and actions for devices and IOCs. Some of the figures show upstream and downstream signals in separate diagrams along with some phase shift to illustrate how phase shifting affects when signals reach the ports. All signals are shown driven with a delay after the appropriate edge to represent clock-to-output delay. The dotted lines in the figures align with falling edges. Dashed lines align with rising edges where confusion might otherwise exist.

Figure 7A:
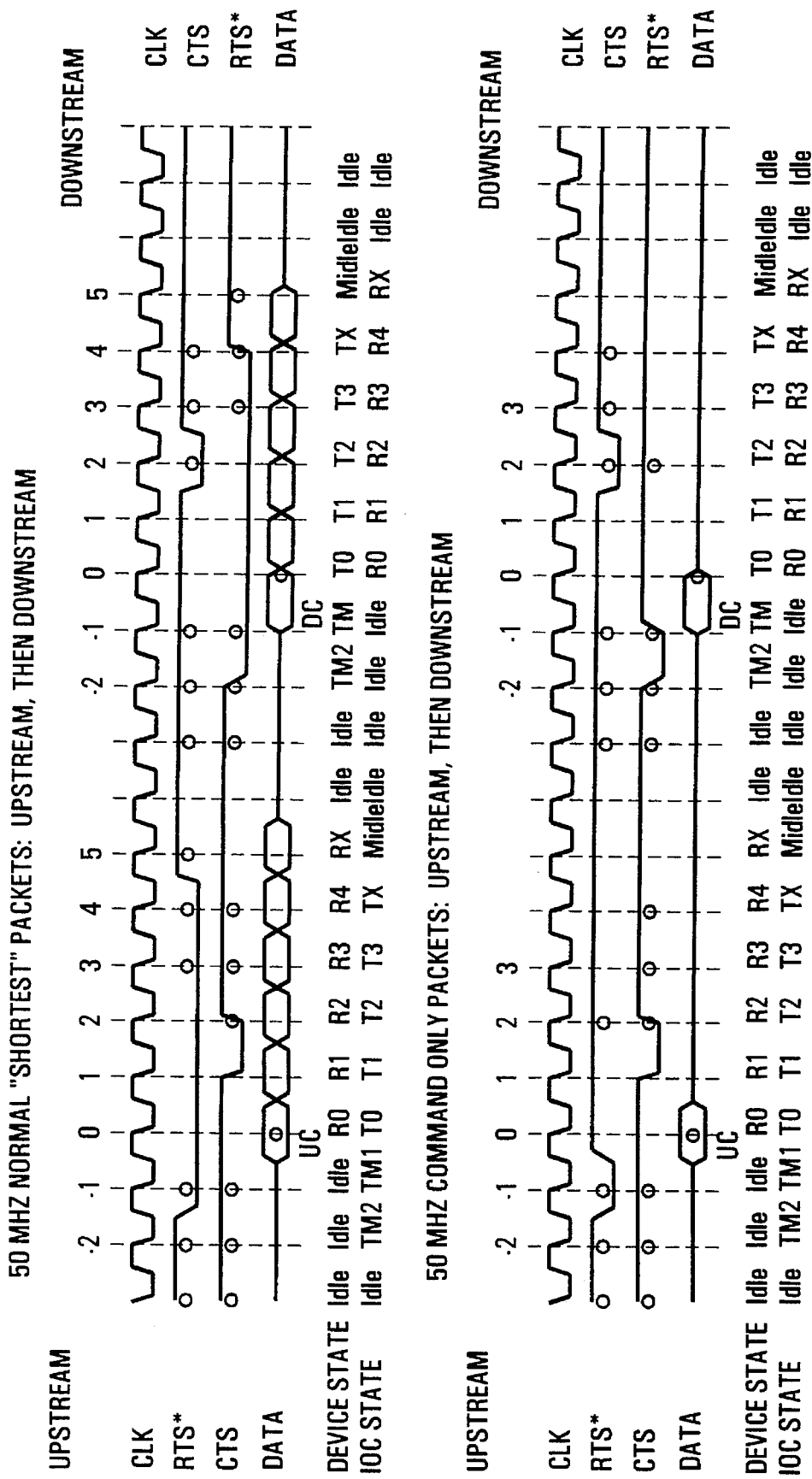
Figure 7B:
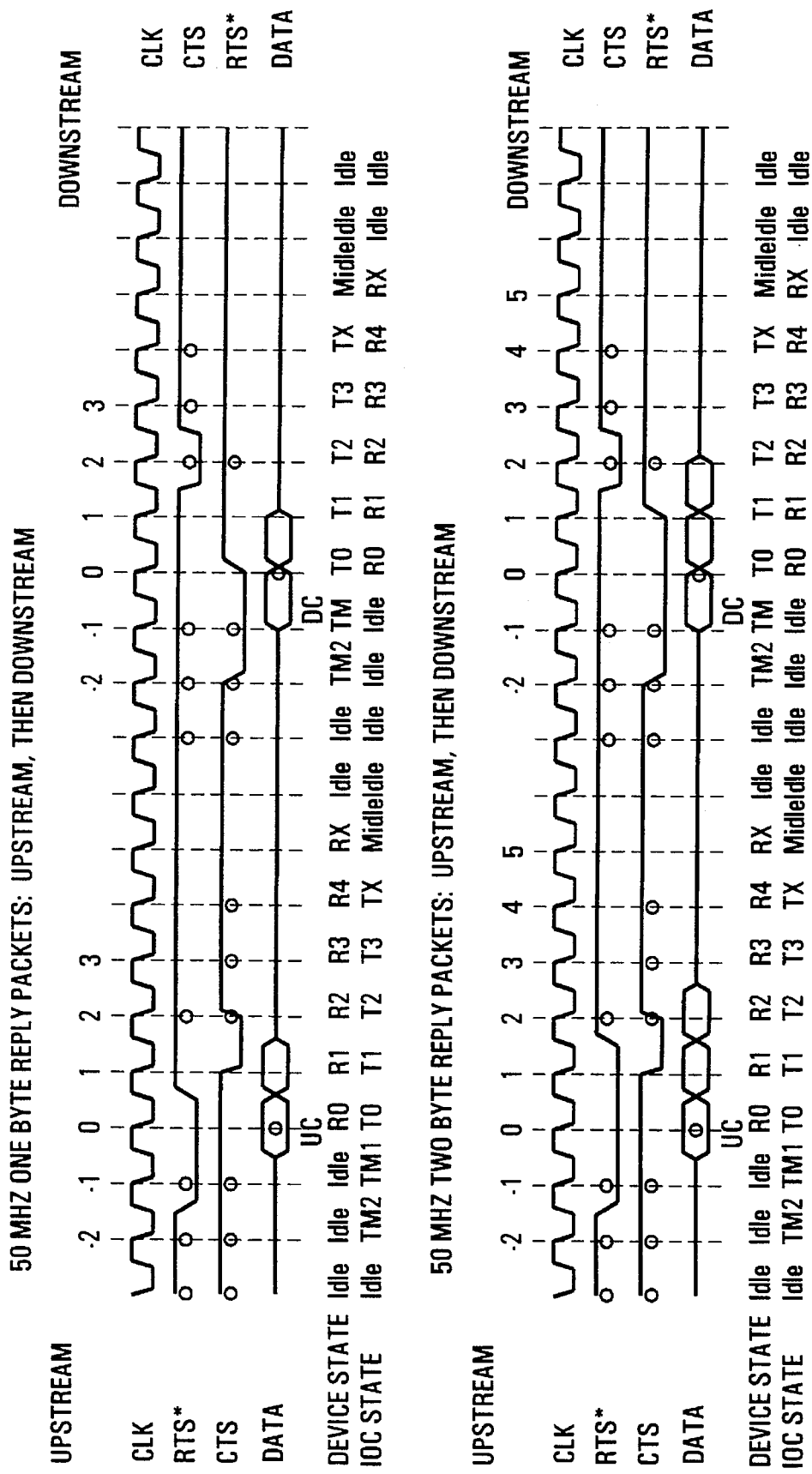

Referring now to FIGS. 7A and 7B, in a single message transfer, a sender port samples its CTS signal TRUE on a falling edge of CLK (−3) and asserts its RTS* signal during the next cycle (−2). The sender also samples it's CTS signal at CLK (−2) and drives the data lines starting with the command byte during the next cycle (−1). The sender continues to sample its CTS signal and drive the remainder of the bytes on each clock. The sender samples its CTS signal FALSE at the falling edge of CLK (2). This is an acknowledgement by the receiver that it recognizes the incoming message. The sender must sample its CTS signal TRUE at the remaining CLKs at the remaining falling edges to follow the standard single cycle. If a sender ever samples its CTS signal FALSE then another cycle type will be followed. The sender finally drives the last byte of the message and at the same time de-asserts its RTS* signal to complete the transfer.

Figure 8:
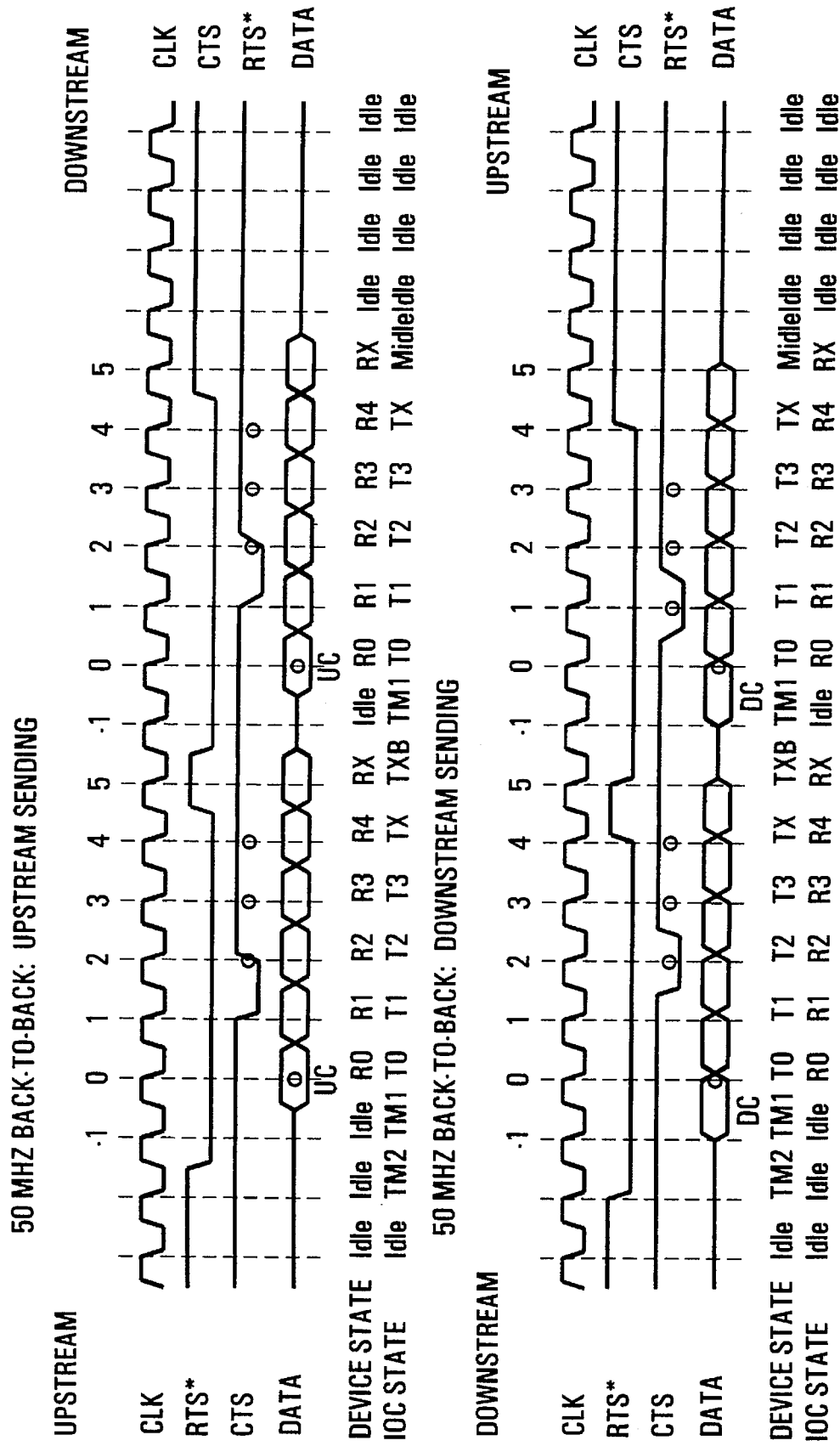

Referring now to FIG. 8, the receiver port receives two consecutive messages from the sender port in a back-to-back transfer. If the CTS signal is sampled TRUE when the last byte is sent (state TX) the sender is allowed to send back-to-back messages. The sender de-asserts it's RTS* signal as the last byte of the message is sent, CLK (4) above, as in a standard single cycle. The sender immediately reasserts it's RTS* signal, CLK (5), and another single message transfer begins. Sampling the CTS signal FALSE on the CLK (4) does not void the current message but simply precludes a back-to-back transfer. If a message is shorter than the one illustrated, the time between messages extends appropriately. Longer messages simply have repeating TX and RX states. Note that the receiver could assert it's RTS* signal during the last transfer states (R3 or RX). If this occurs, the protocol enters a collision sequence and resolves according to those rules.

Figure 9:
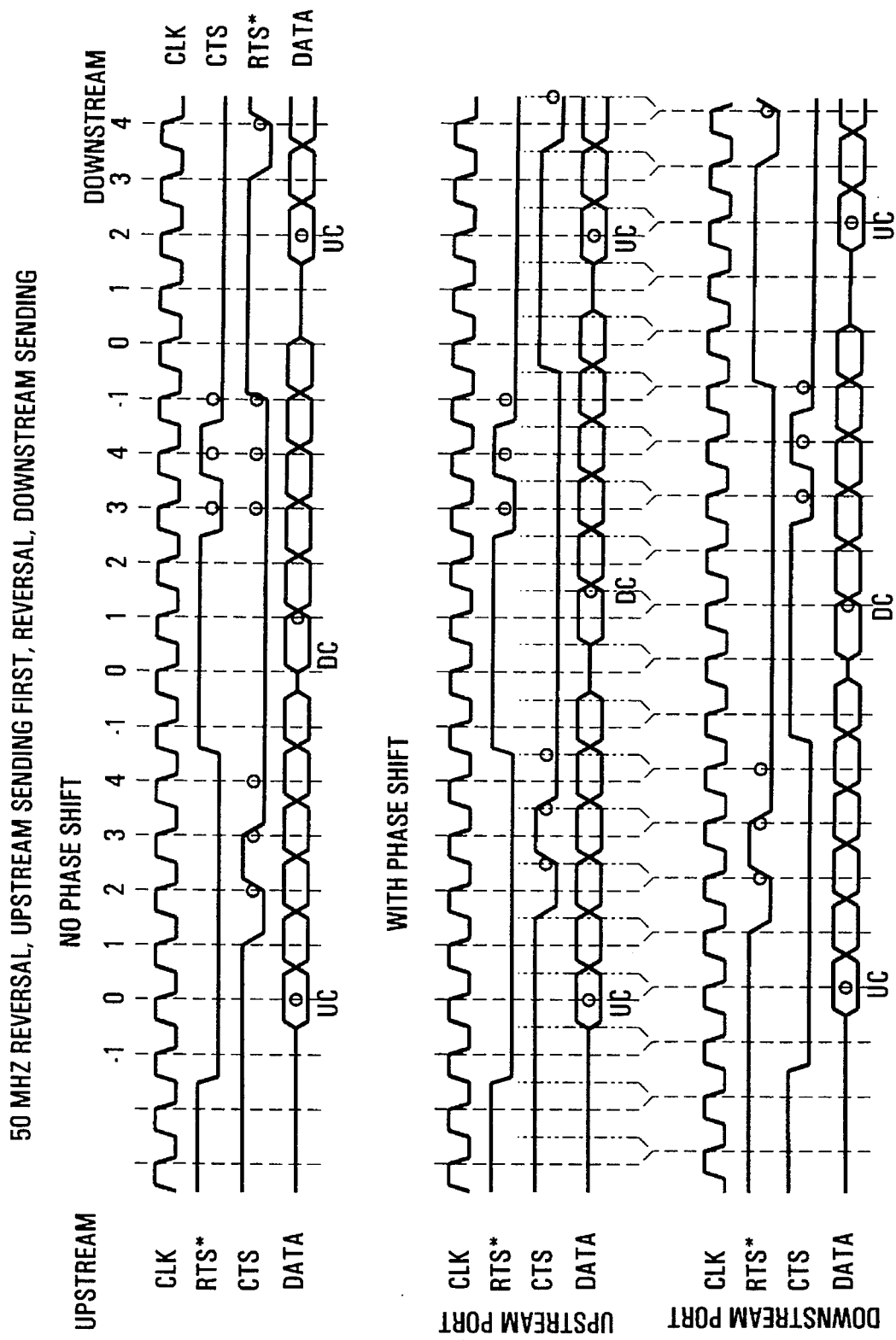

Referring now to FIG. 9, if a port has a message ready to be sent and that port is currently receiving a message, it may request the current sender to reverse the channel at the end of the current message. The receiving port asserts it's RTS* signal at any time during the transmission after CLK 3, but is only guaranteed a reversal if it gets to the sender in time for the sender to sample it on the CLK (−1) that the last byte is sent. The sender thus knows, by sampling it's CTS signal (−1), that it is unable to send a back-to-back message (if it had desired) and that it can expect an incoming message. The receiver may send it's command byte if it already has asserted it's RTS* signal and if it samples the CTS signal high. Note that a channel reversal requires a dead clock. If a message is shorter than the one illustrated, the time between messages extends appropriately.

If the receiver asserts it's RTS* signal too late, it is possible that the transmission might collide with the sender's back to back transmission. If this occurs, the normal collision resolution takes place. If the receiving port knows how long the incoming message is because it decoded the command byte (and the size field if necessary) then it may use this information to avoid the assertion of RTS* signal at the end of the senders message (and subsequent possible collision). This will prevent collisions, but would increase the time to the start of the next message if the sender did not run a back to back cycle. The first set of signals in the figures show what would occur if the channel had no phase shift. The separate upstream and downstream signal sets show a view with phase shift.

Figure 10:
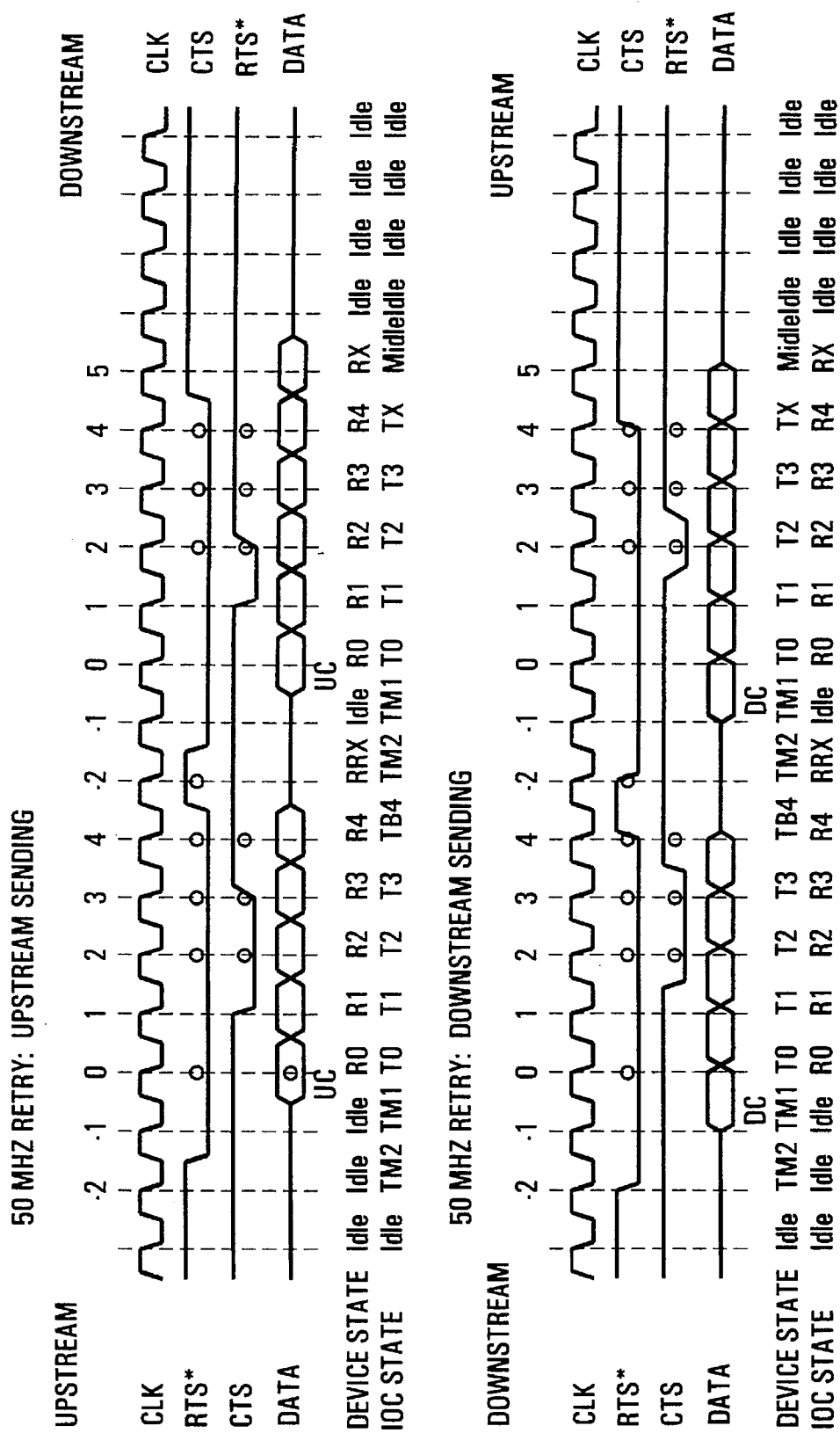

Referring now to FIG. 10, a sender port is backed-off when the receiver port on the other end of the channel currently cannot completely receive the current message. The receiver can backoff the sender by keeping its RTS* signal asserted on the clock following the acknowledgement so that the sender will sample its CTS signal FALSE at state T3. The sender will backoff and de-assert its RTS* signal at the next clock (3 or state TB3). The receiver will discard any part of the message already received.

If the receiver does not want to send a message then it will de-assert its RTS* signal on the next clock, CLK (3). The sender should then retry sending the message (or another higher priority message) as shown.

Figure 11:
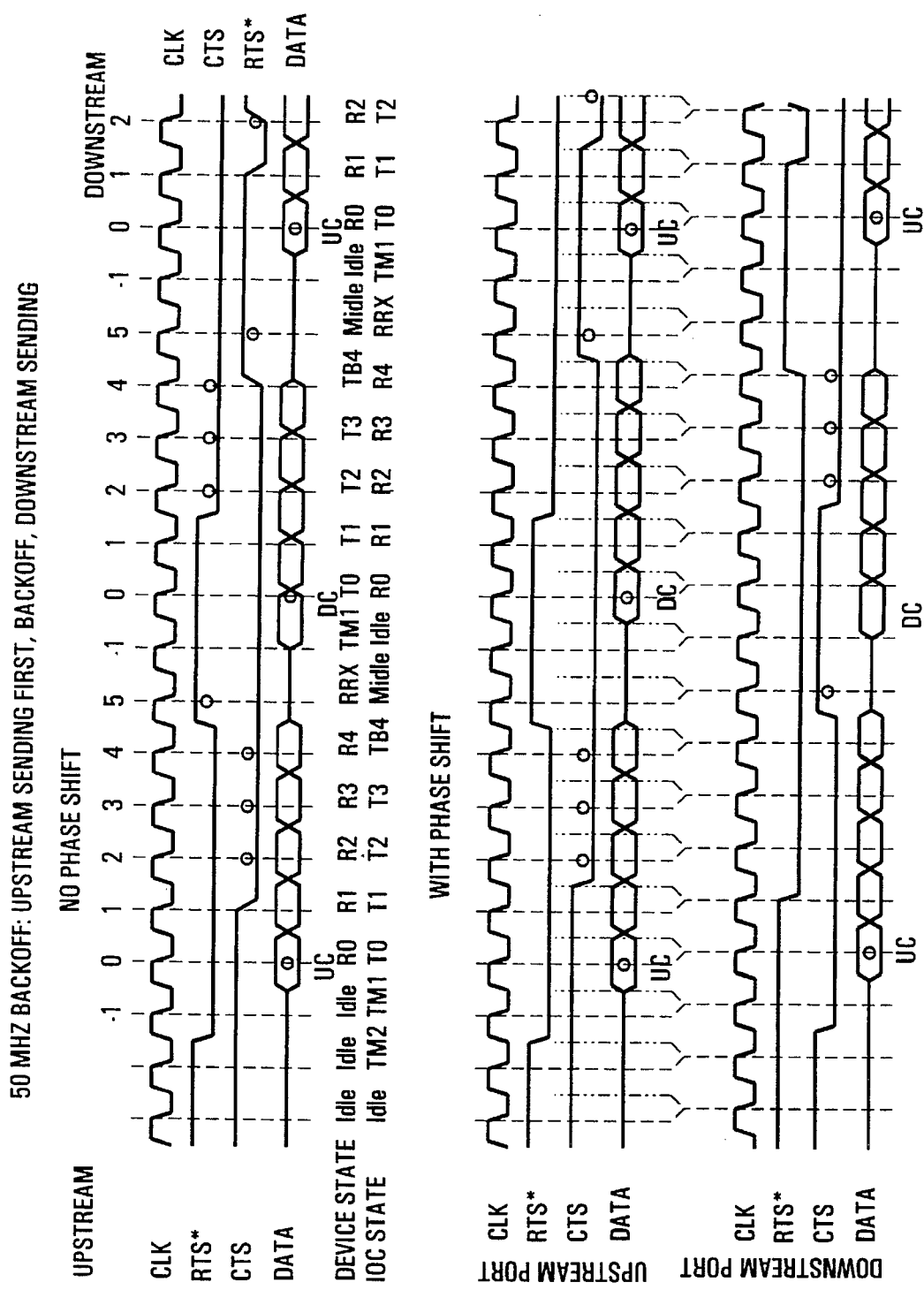

Referring now to FIG. 11, if the receiver wants to send a message it will continue to assert its RTS* signal and send bytes starting with the first clock after it samples its CTS signal TRUE. The figures' first set of signals show what would occur if the channel had no phase shift. The separate upstream and downstream signal sets show a view with phase shift. Note that the first message in each of the figures is terminated early because of the backoff and retry. Note that to backoff the sender, the receiver must assert its RTS* signal on CLK (2) so that the sender will sample CTS signal FALSE on the falling edge of CLK (3).

Figure 12:
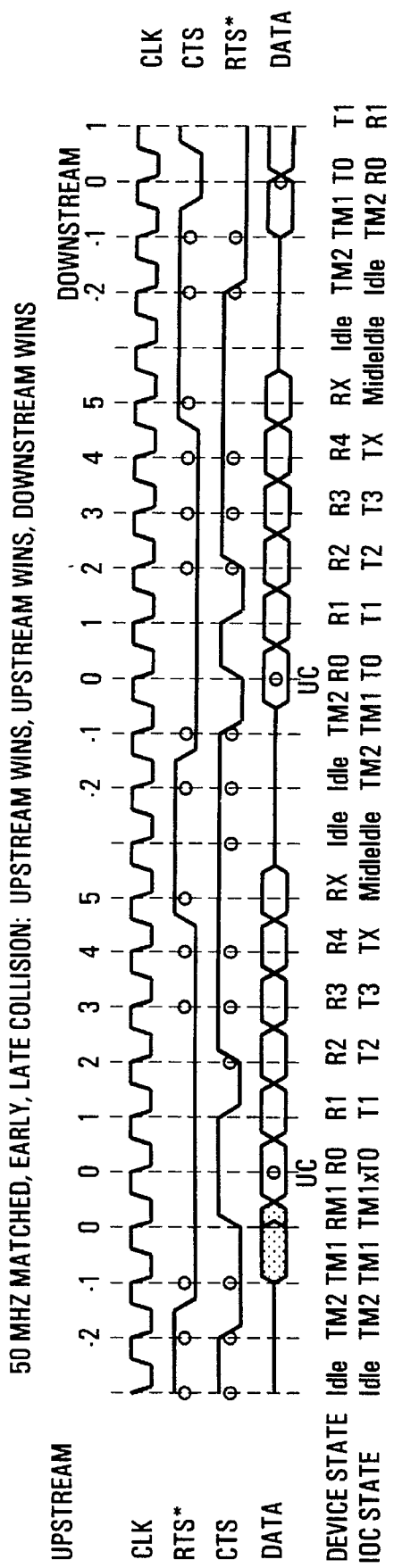

Referring now to FIG. 12, Channel Matched Collision occurs when both A-Net ports on a channel issue their RTS* signal on the same clock cycle as in the first case [−2] in FIG. 12. Both ports sample their CTS signals FALSE during arbitration (state TM1). The upstream port always wins and will continue to assert its RTS* signal and hold its first byte valid for an extra clock (state TM1x) and then proceed normally. The loser (downstream port) de-asserts it's RTS* signal before the second CLK when it realizes the collision (see first case).

If a downstream port asserts its RTS* signal during the first byte of a transmission by the upstream port, an Early Collision has occurred (see second case). In an Early Collision both RTS* signals are asserted in arbitration but data does not actually collide. This will happen if the downstream port tries to start a message one cycle later than the upstream port. The downstream port will realize at state TM2 that it cannot send but does not have the time to keep from asserting its RTS* signal. The downstream port will go into receive mode and de-assert its RTS* signal (state R0). The sender (upstream port) simply ignores its CTS input during the first byte cycle.

If an upstream port asserts its RTS* signal during the first byte of a transmission by the downstream port, a Late Collision has occurred (see third case). In a Late Collision both RTS* signals are asserted in arbitration but data does not actually collide. This will happen if an upstream port tries to start a message one cycle later than the downstream port. The upstream port will realize at state TM2 that it cannot send but does not have the time to keep from asserting its RTS* signal. The upstream port will go into receive mode and de-assert its RTS* signal (state R0). The sender (downstream port) simply ignores its CTS input during the first byte cycle.

As in any computer system, the various devices must be configured after reset and the system booted. The goals of the A-Net configuration/boot process include determining the topology of the subsystem, initializing all IOCs, determining all devices in the system and taking appropriate action for each, locating all bootable devices, presenting the loaded operating system with all necessary information about the A-Net subsystem and booting the operating system from the appropriate device.

Figure 13A:
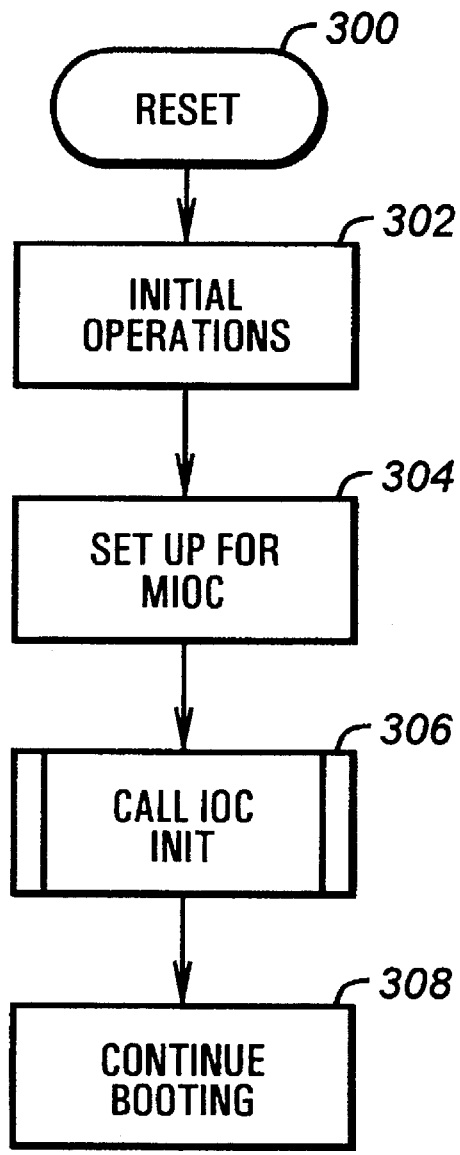
FIGS. 13A and 13B are flowcharts of the initialization sequence for the input/output units of FIG. 1.
Figure 13B:
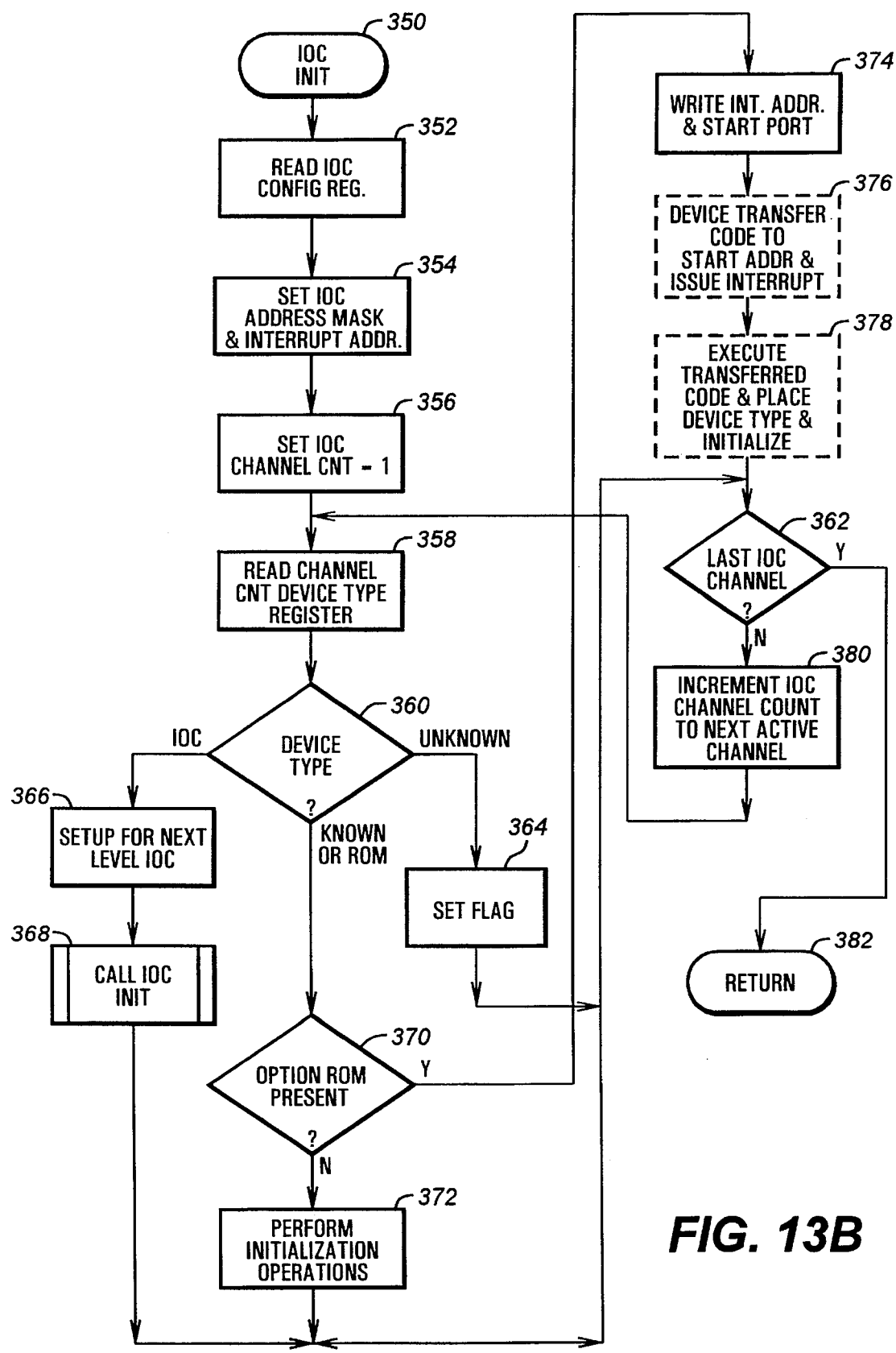

The following paragraphs illustrate the steps required to configure and boot an A-Net subsystem, with FIGS. 13A and 13B showing portions in a flowchart format.

The following boot sequence is started at the MIOC 120 and iterated throughout the configuration of an A-Net subsystem. First, read the IOC's IOC__Config register to determine the number of channels the IOC supports. Next, set the IOC's IOC__Address__Mask to reflect the number of channels. Then generate a read of the A-Net__Device__Type register for each channel in turn. Based on the device, perform appropriate action. This four step process is continued until the entire topology of the particular A-Net implementation is determined, and all devices have been identified.

The many different device types that are returned by the A-Net__Device__Type register read may be grouped into three basic categories based on the following characteristics. First, a device that the configuration code recognizes. Second, a device that the configuration code does not recognize. Third, a device that is another IOC. If the device is one that the configuration code recognizes, the code simply performs any necessary initialization and returns to the channel check iteration explained above. In the event that the device is not recognized, minimally the configuration code informs the operating system at boot time about the device's type identifier and its location in the A-Net topology. If the device is another IOC, the IOC initialization steps outlined above are simply executed for the next level IOC.

If the queried channel does indeed support a device, it may certain an option ROM and/or be bootable. If bit 31 of the A-Net__Device__Type value returned by the device is SET, the device has an option ROM that must be initialized. Upon recognizing that the device has an option ROM, the system master initializes the device's Dev__Interrupt__Address and performs a write to the device's Dev__Start__Port. The value of the write will be the location to which the device should move its first 4K of code. When the device has completed the 4K code transfer, it generates a cycle to the address placed in the Dev__Interrupt__Address. After recognizing the interrupt, the system master will begin execution of the ROM code at the address written to the Dev__Start__ Port. The device's option ROM code should notify the configuration code of its device type via a Device__ROM__ Type service and perform any necessary initialization of the device and return control to the configuration code.

Note that in the event that the device is bootable, it must also call the configuration code service Boot__Device__ Entry to inform the configuration code of the location and size of the device's boot code as well as the boot priority of the device.

Bootable devices are recognized in one of two ways. First, the boot code recognizes the A-Net__Device__Type value read from the device as one that is bootable. Secondly, the device may have option ROMs that inform the configuration code of the fact that it is bootable. The configuration code determines all bootable devices in the A-Net system during the determination of the topology and passes this information to the system boot code. To determine the primary bootable device, the system boot code chooses the highest priority option ROM based bootable device to attempt boot. Should that fail, any remaining Option ROM based bootable devices will be tried in the order of their priority. Finally, each system ROM understood device will be tried in the order of their implementation dependant priorities.

The information on how to boot a device will be found in one of two places. In the case of a device that is recognized by the configuration code, the system boot code will have the knowledge required to boot the device. If option ROMs are used, the call to the Boot__Device__Entry system service will include the device's boot entry.

The hot plugging of devices is a special sub-set of the normal A-Net boot procedure. The effected IOC must generate an exception to the appropriate system master, as defined in the IOC__Exception__Address register, both when an A-Net expansion board is removed and/or when one is inserted. The exception handler will then read the IOC__ Exception__Status register, which will inform the handler that a device was removed from the system or a new device was 'hot plugged' into the given channel. The system master will immediately perform the boot procedure outlined above on the indicated channel, taking appropriate action as necessary.

Proceeding now to FIGS. 13A and 13B, the IOC initialization operations are shown in a flowchart format. The computer system resets and commences the reset sequence 300. At step 302 various initialization operations are performed. Conventionally this would include testing portions of the memory 112 to assure that the RAM is satisfactory, performing any necessary testing of the cache 104 and the boot processor 100 and other certain minimal and immediate initialization operations. After these initial operations are concluded, control proceeds to step 304 where a structure is set up to initialize the MIOC 120. Control then proceeds to step 306 where the IOC INIT sequence 350 is called. After the IOC INIT sequence 350 is finally completed and the entire chain has been initialized and determined, control proceeds to step 308 where the computer system C continues the booting process as described above.

The IOC INIT sequence 350 commences at step 352 where the IOC configuration register is read. This determines how many channels are located on the downstream side of the IOC and which of these channels has a device connected to it. Control then proceeds to step 354 where the IOC__Address__Mask is set and the Interrupt__Address is loaded. Control proceeds to step 356 where an IOC channel counter is set to 1. Control proceeds to step 358 where the A-Net device type register for the particular channel count is read to determine what device is attached to that particular port. If the device is unknown, control proceeds to step 364 where a flag is set to indicate to the configuration code the unknown status. Control then proceeds to step 362. If the next level device is an IOC, control proceeds to step 366 where structures are set up for a next level of IOC. Control then proceeds to step 368 where the IOC INIT sequence 350 is again called. Therefore it is clear that the IOC INIT sequence 350 must be reenterable so that these threads can begin. After the IOC INIT sequence is completed in step 358, control proceeds to step 362.

If it is determined in step 360 that the device type was either a known type or indicated an option ROM, control proceeds to step 370 to determine if an option ROM was present. If not, control proceeds to step 372 where the proper initialization operations for the particular device are performed. Control then proceeds to step 362.

If an option ROM was present as determined in step 370, control proceeds to step 374 where the Interrupt__Address and Start__Port registers are written for that particular device. Writing to the Start__Port device as described above causes the device to transfer the first 4K of the option ROM to the address provided. This is shown in the dotted operation step 376. While step 376 and the following step 378 are asynchronous events and performed in parallel, they are shown in this flowchart to show actual data flow operation. In step 376 the device transfers the ROM code to the starting address at the Start__Port and issues an interrupt back-up to the boot processor. The boot processor is interrupted and executes step 378 which is an execution of the ROM code which has been transferred to memory. This code includes placing the device type in the proper table as noted above and initializing the device. Control then proceeds to step 362.

In step 362 a determination is made as to whether this is the last channel for this particular IOC. If not, control proceeds to step 380 where the IOC channel counter is incremented to the next active channel and control proceeds to step 358 to reiterate for the next channel. If this was the last channel, control proceeds to step 382 which is a return from the sequence.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. An input/output subsystem for a computer system, the computer system having a means for providing and receiving addresses and data to perform operations, the input/output subsystem comprising:

a plurality of addressable input/output devices receiving and providing packets, each of said input/output devices having an address range unique to that input/output device, each of said packets having a plurality of fields according to a predetermined protocol, said packets including a command portion and being formed of a plurality of elements; and means connected to said means for providing and receiving addresses and data and each of said plurality of input/output devices for transferring data between said means for providing and receiving addresses and data and each of said plurality of input/output devices, each of said plurality of input/output devices separately connected to said means for transferring, wherein said means for transferring includes:
    means for determining if an address and data operation is or a plurality of address and data operations are directed to one of said plurality of input/output devices by analyzing said address portion of said operation or operations to determine if the address provided in said address portion of said operation or operations corresponds to an address within one of said unique address ranges of said plurality of input/output devices;
    means for converting said address and data operation or said plurality of address and data operations to a packet;
    means for transmitting said packet developed by said means for converting to a packet to said one of said plurality of input/output devices as a series of said plurality of elements forming said packet;
    means for receiving a packet from one of said plurality of input/output devices as a series of said plurality of elements forming said packet;
    means for converting said packet received from said one of said plurality of input/output devices to an address and data operation or a plurality of address and data operations; and
    means for providing the output of said means for converting said packet to said means for providing and receiving addresses and data.

2. The input/output subsystem of claim 1, wherein each of said plurality of input/output devices includes a port, said port for receiving said packet from said means for transferring and for transmitting said packet to said means for transferring, and wherein said means for transmitting said packet and said means for receiving said packet comprise a plurality of ports for transmitting said packet and receiving said packet, with each of said plurality of ports connected to a respective port of one of said plurality of input/output devices.

3. The input/output subsystem of claim 2, wherein said means for transmitting and said means for receiving include a first level device and at least one concentrator device, said first level device having a first number of ports, each said concentrator device having a port connected to one of said first level ports or a concentrator device and further having a predetermined number of said ports for connection to input/output devices or further concentrator devices, wherein said first number of ports of said first level device and said total number of predetermined ports of said concentrator devices less the number of said concentrator devices is greater than or equal to the number of said plurality of input/output devices.

4. The input/output subsystem of claim 3, wherein read operations are performed as split transactions and each of said concentrator devices includes a queue of port numbers for maintaining strict ordering of read operation responses.

5. The input/output subsystem of claim 3, wherein a concentrator device includes means for prefetching read operation data and for posting write operation data for at least one port.

6. The input/output subsystem of claim 3, wherein said first level device, each said concentrator device and each of said plurality of input/output devices includes a plurality of addressable registers, wherein each of said plurality of addressable registers includes a register indicating the type of device.

7. The input/output subsystem of claim 6, wherein said plurality of addressable registers in said input/output devices further includes a register for receiving an address to which to send an interrupt, a register at which to receive an interrupt request and a register at which to receive a memory address indicating a location of a data structure.

8. The input/output subsystem of claim 6, wherein said plurality of addressable registers of said first level device further includes a register indicating the value of said first number of ports, said plurality of addressable registers of each said concentrator device further includes a register indicating the value of said predetermined number, and said plurality of addressable registers in said first level device and each said concentrator device further includes a register indicating an address decode location for determining if an address provided on said bus is directed to said first level device or said concentrator device or to one of said ports of said first level device or said concentrator device.

9. The input/output subsystem of claim 8, wherein the address used to address an input/output device comprises a plurality of bytes and wherein the value in said address decode location register indicates the byte and the bit starting in the byte used for address decode to determine if said packet is for said first level device, said concentrator device or to an input/output device coupled to one of said ports of said first level device or said concentrator device.

10. The input/output subsystem of claim 2, wherein an input/output device includes two of said ports and two of said ports of said means for transmitting said packet and said means for receiving said packet are connected to said two ports on said input/output device.

11. The input/output subsystem of claim 2, wherein said data is transmitted in a parallel manner between the means for providing and receiving addresses and data and the input/output subsystem and between said ports, and wherein said means for transmitting and said means for receiving further include:
    means for receiving said packet from said means for transferring in a parallel data format and for transmitting said packet to said means for transferring in a parallel data format and for transmitting said packets received from said means for transmitting in a serial data format and for receiving packets for transmitting to said means for receiving in a serial data format; and
    means for receiving a packet in serial data format from said means for transferring in a serial data format and transmitting said packet from a port in a parallel data format and for transmitting a packet in a serial data format to said means for transferring in a serial data format received at said port in a parallel data format.

12. The input/output subsystem of claim 11, wherein the computer system includes two separate housings and one of said parallel to serial and serial to parallel means is located in one of said housings and the other of said parallel to serial and serial to parallel means is located in the other of said housings.

13. The input/output subsystem of claim 1, wherein said command portion of said packet indicates a data movement command or a control or status command.

14. The input/output subsystem of claim 13, wherein said data movement commands include read requests, write requests, exchanges, compare and swaps and read responses.

15. The input/output subsystem of claim 14, wherein said read and write request commands include indications of the number of data bytes to be transferred.

16. The input/output subsystem of claim 14, wherein said read and write requests and said exchange and said compare and swap include the starting address of the data.

17. The input/output subsystem of claim 13, wherein said control or status commands include exception indications.

18. A computer system comprising:
a plurality of processors, each processor including a central processing unit performing address and data operations, memory and an input/output system interface means to provide and receive packets to perform operations, each of said packets having a plurality of fields according to a predetermined protocol, said packets including a command portion and being formed of a plurality of elements and being directed to a particular address; and
a plurality of addressable input/output devices receiving and providing packets, each of said input/output devices having an address range unique to that input/output device, each of said input/output devices including means separately connected to said input/output system interface means of each of said processors for providing and receiving packets,
wherein each of said input/output system interface means includes:
means for determining if an address and data operation is or a plurality of address and data operations are directed to one of said plurality of input/output devices by analyzing said addresses provided by said central processing unit to determine if the address provided by said central processing unit corresponds to an address within one of said unique address ranges of said plurality of input/output devices;
means for converting said address and data operation or said plurality of address and data operations to a packet;
means for transmitting said packet developed by said means for converting to a packet to said one of said plurality of input/output devices as a series of said plurality of elements forming said packet;
means for receiving a packet from one of said plurality of input/output devices as a series of said plurality of elements forming said packet;
means for converting said packet received from said one of said plurality of input/output devices to an address and data operation or a plurality of address and data operations; and
means for providing the output of said means for converting said packet to said input/output interface means of each of said processors.

19. The computer system of claim 18, wherein each of said plurality of input/output devices includes a port for receiving said packet from each of said input/output system interface means of each of said processors; and
wherein said input/output system interface means of each of said processors includes a plurality of ports for transmitting said packet and receiving said packet, with each of said plurality of ports connected to a respective port of one of said plurality of input/output devices.

20. The computer system of claim 19, wherein an input/output device includes two of said ports and two ports of said input/output system interface means are connected to said two ports on said input/output device.

21. A computer system comprising:
a microprocessor performing address and data operations and having a graphics interface means to receive and provide packets and an input/output system interface means to receive and provide packets, each of said packets having a plurality of fields according to a predetermined protocol, said packets including a command portion and being formed of a plurality of elements and being directed to a particular address;
a main memory connected to said microprocessor;
a graphics controller connected to said graphics interface means; and
an input/output system connected to said input/output system interface means, said input/output system including:
a plurality of addressable input/output devices receiving and providing packets each of said input/output devices having an address range unique to that input/output device; and
means separately connected to said input/output system interface means and each of said plurality of input/output devices for transferring data between said microprocessor and each of said plurality of input/output devices, wherein said means for transferring includes:
means for determining if a packet is directed to one of said plurality of input/output devices by analyzing said address portion of said packet to determine if the address provided in said address portion of said packet corresponds to an address within one of said unique address ranges of said plurality of input/output devices;
means for transmitting said packet to said one of said plurality of input/output devices as a series of said plurality of elements forming said packet;
means for receiving a packet from one of said plurality of input/output devices as a series of said plurality of elements forming said packet; and
means for providing said received packet to said input/output system interface means.

22. The computer system of claim 21, wherein each of said plurality of input/output devices includes a port for receiving said packet from said means for transferring and for transmitting said packet to said means for transferring, and
wherein said means for transmitting said packet and said means for receiving said packet comprise a plurality of ports for transmitting said packet and receiving said packet, with each of said plurality of ports connected to a respective port of one of said plurality of input/output devices.

23. The computer system of claim 22, wherein said input/output system interface means includes a port for transmitting said packet and receiving said packet and wherein said means for transmitting and said means for receiving includes at least one concentrator device, each said concentrator device having a port connected to said input/output system interface means or a concentrator device and further having a predetermined number of said ports for connection to input/output devices or further concentrator devices, wherein said total number of predetermined ports of said concentrator devices less the number of said concentrator devices is greater than or equal to the number of said plurality of input/output devices.

24. The computer system of claim 23, wherein each said concentrator device and each of said plurality of input/output devices includes a plurality of addressable registers, wherein each of said plurality of addressable registers includes a register indicating the type of device.

25. The computer system of claim 24, wherein said plurality of addressable registers in said input/output devices further includes a register for receiving an address to which to send an interrupt, a register at which to receive an interrupt request and a register at which to receive a memory address indicating a location of a command list.

26. The computer system of claim 24, wherein said plurality of addressable registers of each said concentrator device further includes a register indicating the value of said predetermined number, and each said concentrator device further includes a register indicating an address decode location for determining if an address provided with said packet is directed to said concentrator device or one of said ports of said concentrator device.

27. The computer system of claim 26, wherein the address used to address an input/output device comprises a plurality of bytes and wherein the value in said address decode location register indicates the byte and the bit starting in the byte used for address decode to determine if said packet is for said first level device, said concentrator device or to a device coupled to one of said ports.

* * * * *